US009002648B2

(12) United States Patent
Pfutzner

(10) Patent No.: US 9,002,648 B2
(45) Date of Patent: Apr. 7, 2015

(54) METHOD AND APPARATUS FOR PRECISE POSITIONING OF A BOREHOLE MEASUREMENT INSTRUMENT

(75) Inventor: Harold G. Pfutzner, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 585 days.

(21) Appl. No.: 12/698,667

(22) Filed: Feb. 2, 2010

(65) Prior Publication Data
US 2011/0185806 A1 Aug. 4, 2011

(51) Int. Cl.
G01V 1/40 (2006.01)
G01V 7/06 (2006.01)
G01V 1/24 (2006.01)
G01V 1/16 (2006.01)
E21B 47/09 (2012.01)
E21B 23/00 (2006.01)

(52) U.S. Cl.
CPC .. G01V 7/06 (2013.01); G01V 1/24 (2013.01); G01V 1/16 (2013.01); E21B 47/09 (2013.01); E21B 23/00 (2013.01)

(58) Field of Classification Search
USPC ............ 702/6, 7, 11, 16, 113, 114, 116, 141, 702/166
See application file for complete search history.

(56) References Cited

U.S. PATENT DOCUMENTS 4,396,838 A * 8/1983 Wolcott, Jr. ................. 250/256
4,399,693 A 8/1983 Gournay
4,475,386 A 10/1984 Fitch et al.
4,517,836 A 5/1985 Lyle et al.
4,596,139 A 6/1986 Gournay
4,625,547 A 12/1986 Lyle, Jr.
5,204,568 A 4/1993 Kleinberg et al.
5,351,122 A 9/1994 Niebauer et al.
5,869,759 A 2/1999 Seigel
5,892,151 A 4/1999 Niebauer et al.

(Continued)

OTHER PUBLICATIONS

Adams "Gas Saturation Monitoring in North Oman Reservoir Using a Borehole Gravimeter", SPE 21414-SPE Middle East Oil Show, Nov. 16-19, 1991, 10 pages.

(Continued)

*Primary Examiner* — Sujoy Kundu
*Assistant Examiner* — Paul D Lee
(74) *Attorney, Agent, or Firm* — Cathy Hewitt

(57) ABSTRACT

A system and method for use in a downhole tool having distance measurement, feature detection, and primary measurement devices positioned therein are provided. In one example, the method includes recording a first plurality of features and corresponding positions in a first log using the feature detection device and the distance measurement device, respectively. A first feature of the first plurality of features is selected and the position corresponding to the first feature is identified. The feature detection device is aligned relative to the first feature based on the identified position. A first primary measurement is taken using the primary measurement device while the feature detection device is aligned relative to the first feature. The steps of recording, selecting, moving, and taking are repeated to obtain a second primary measurement while the feature detection device is aligned relative to a second feature of a second plurality of features.

22 Claims, 8 Drawing Sheets

(56) References Cited

U.S. PATENT DOCUMENTS

| | | | |
|---|---|---|---|
| 5,970,787 A | 10/1999 | Wignall | |
| 6,084,403 A | 7/2000 | Sinclair et al. | |
| 6,273,189 B1* | 8/2001 | Gissler et al. | 166/241.1 |
| 6,298,722 B1 | 10/2001 | Faller et al. | |
| 6,612,171 B1 | 9/2003 | Stephenson et al. | |
| 6,671,057 B2 | 12/2003 | Orban | |
| 6,776,035 B2 | 8/2004 | Wijeyesekera et al. | |
| 6,871,542 B2 | 3/2005 | Veryskin | |
| 6,931,709 B2 | 8/2005 | Hugill | |
| 7,069,780 B2 | 7/2006 | Ander | |
| 7,386,942 B2 | 6/2008 | Seigel | |
| 7,406,390 B2 | 7/2008 | Niebauer et al. | |
| 7,451,645 B2 | 11/2008 | Niebauer et al. | |
| 2005/0056415 A1* | 3/2005 | Zillinger | 166/66 |
| 2005/0241835 A1* | 11/2005 | Burris et al. | 166/381 |
| 2008/0041596 A1 | 2/2008 | Blount et al. | |
| 2008/0092653 A1 | 4/2008 | Seigel et al. | |
| 2008/0271533 A1 | 11/2008 | Csutak | |
| 2008/0295594 A1 | 12/2008 | Aliod et al. | |
| 2008/0314582 A1 | 12/2008 | Belani et al. | |
| 2009/0044618 A1 | 2/2009 | DiFoggio et al. | |
| 2009/0114013 A1 | 5/2009 | DiFoggio | |
| 2009/0114014 A1 | 5/2009 | Csutak | |
| 2009/0126486 A1 | 5/2009 | Georgi et al. | |
| 2009/0164187 A1 | 6/2009 | Habashy et al. | |
| 2009/0164188 A1 | 6/2009 | Habashy et al. | |
| 2011/0191027 A1 | 8/2011 | Pfutzner et al. | |

OTHER PUBLICATIONS

Belknap, et al., "API Calibration Facility for Nuclear Logs", Drilling and Production Practice, American Petroleum Institute, #59-289, 1959, pp. 289-316.

Popta, et al, "Use of Borehole Gravimetry for Reservoir Characterization and Fluid Saturation Monitoring", SPE 20896-presented at Europec 90, the Hague, Netherlands, Oct., 1990, pp. 151-160.

"Schlumberger Chronological Sample Taker (CST)", Schlumberger Operating Reference Manual, Aug. 2004, 2 pages.

International Search Report and Written Opinion issued in PCT/US2011/022684 on Jun. 30, 2011, 5 pages.

* cited by examiner

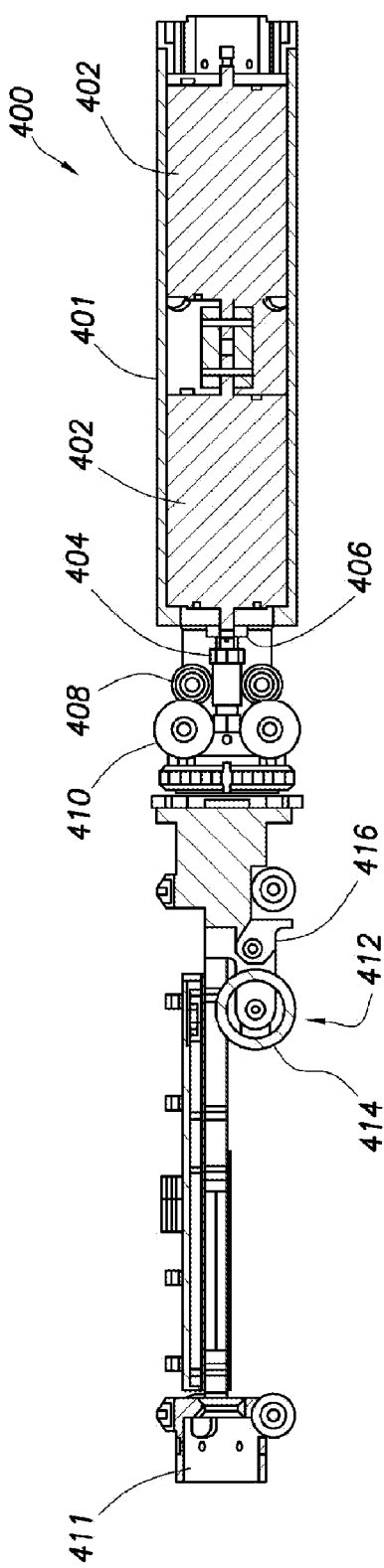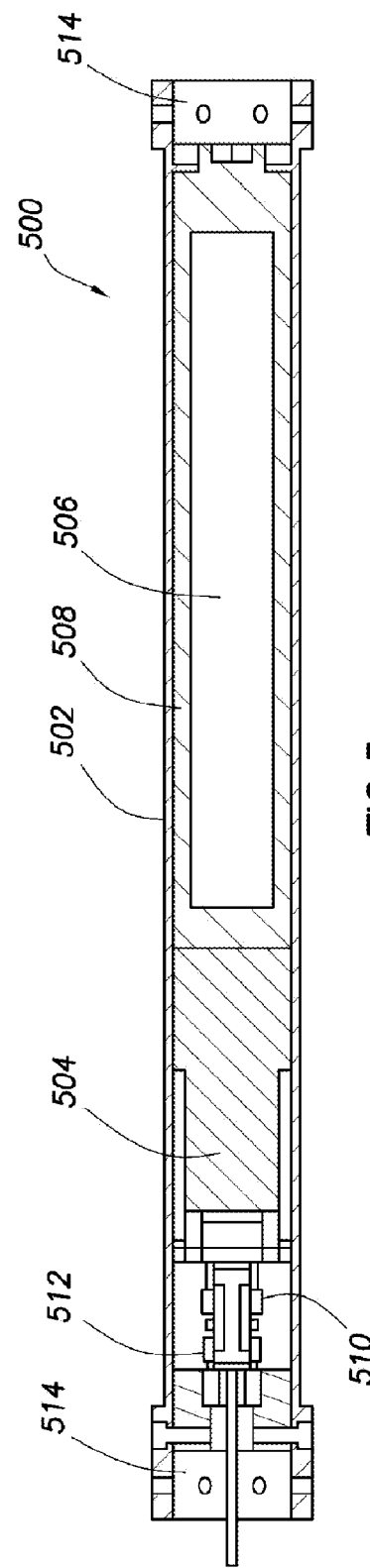

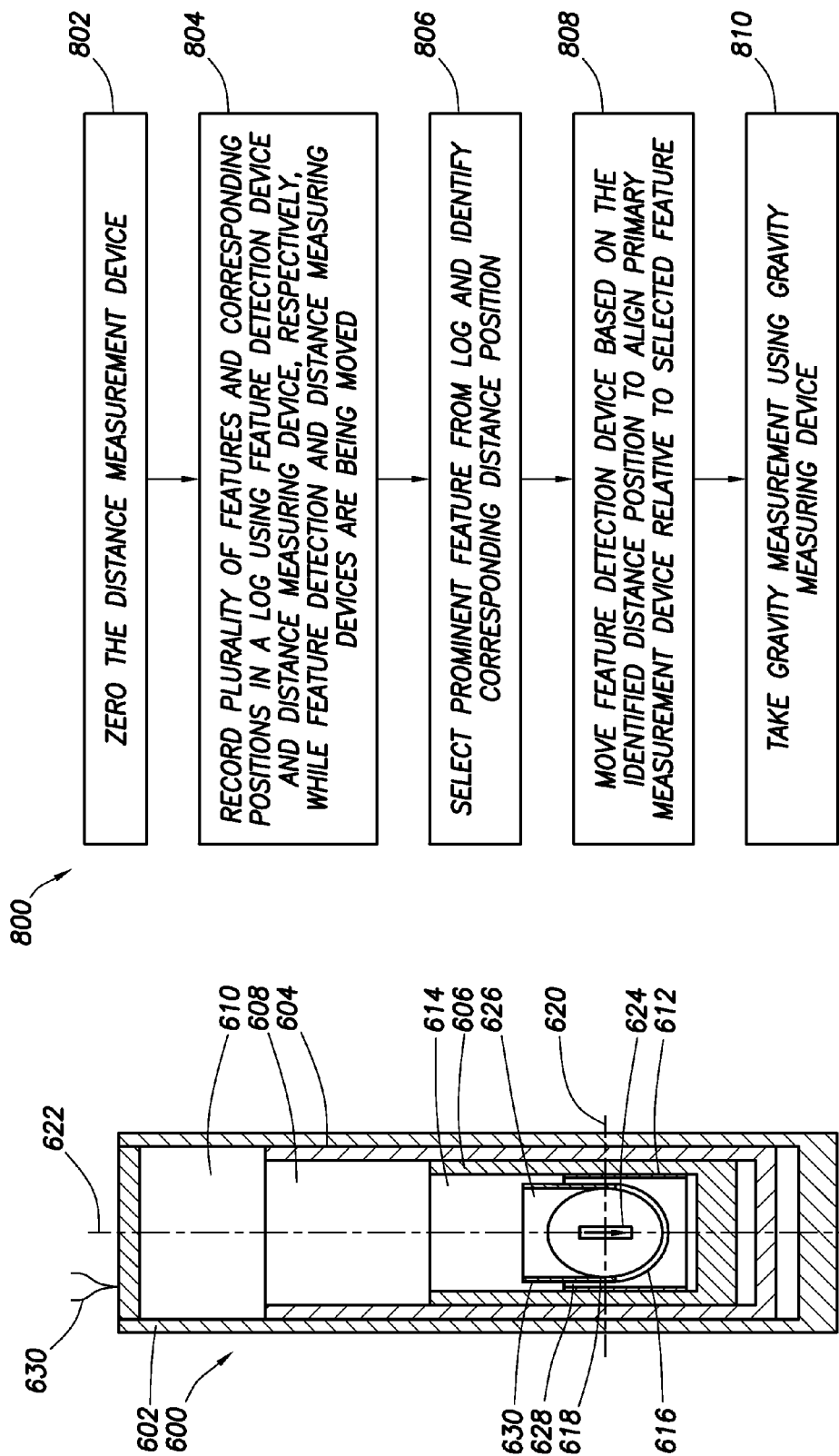

METHOD AND APPARATUS FOR PRECISE POSITIONING OF A BOREHOLE MEASUREMENT INSTRUMENT

BACKGROUND

Exploration for underground resources such as hydrocarbons includes the evaluation of reservoirs to determine the presence and/or movement of fluids such as oil, gas, and water. One method for such an evaluation includes the use of gravity measurements obtained using a downhole tool. The gravity measurements may be used to map out the vertical distribution of oil and gas in a borehole by enabling the calculation of the bulk density of an area adjacent to the downhole tool based in part on relatively minute gravity changes between different positions of the borehole.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4 is a schematic view of a portion of the apparatus of FIG. 3 according to one or more aspects of the present disclosure.

FIG. 5 is a schematic view of a portion of the apparatus of FIG. 3 according to one or more aspects of the present disclosure.

FIG. 6 is a schematic view of a portion of the apparatus of FIG. 3 according to one or more aspects of the present disclosure.

FIG. 8 is a flow chart diagram of at least a portion of a method according to one or more aspects of the present disclosure.

DETAILED DESCRIPTION

Figure 1A:
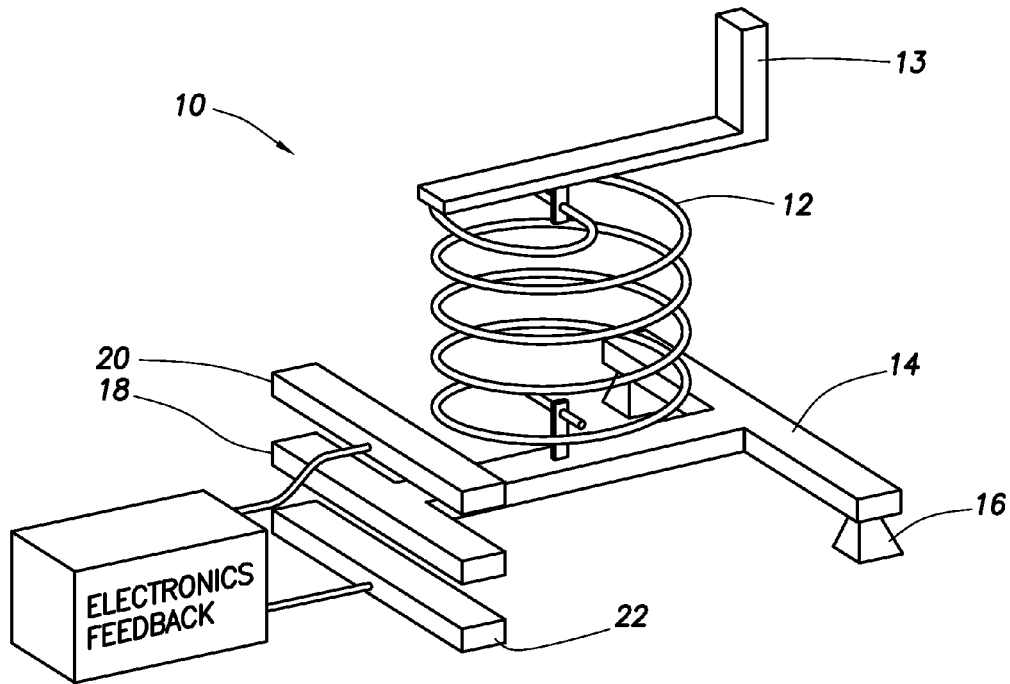
FIG. 1A is a schematic view of a conventional gravimeter.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1A is a schematic of one embodiment of a gravimeter device 10 that may be used in current borehole gravimetry methods. For example, the gravimeter device 10 may be used in a downhole tool (not shown). The gravimeter device 10, which is used to sense the acceleration due to gravity, is formed by a spring 12 and lever 14 positioned inside a ball (not shown) and may have a controlled temperature. The spring 12 is coupled to a support 13 and the lever 14. The lever 14 is attached to hinges 16 at one end and has a "proof mass" 18 attached at the other end. The lever 14 and proof mass 18 are supported by the spring 12 positioned above the lever 14.

In a nominal gravitational field where the gravimeter device 10 has been manufactured and calibrated, the proof mass 18 may be centered between a pair of horizontal, rectangular electrodes 20 and 22. When the gravimeter device 10 is moved to a location with lesser or greater acceleration due to gravity, the proof mass 18 and coupled lever 14 move up or down, respectively, due to lesser or greater weight of the proof mass 18. A direct current (DC) electric field is applied across the two horizontal electrodes 20 and 22 in order to offset the force that would move the lever 14 and proof mass 18, such that the proof mass 18 remains centered between the two electrodes 20 and 22. The voltage applied to the electrodes 20 and 22 is correlated to the local gravitational field in the z-direction and is sensed by a digitizing circuit (not shown) to provide the output of the gravimeter device 10. A state-of-the-art device may be sensitive to differences in acceleration due to gravity of one to three $\mu$Gal, where one $\mu$Gal is approximately equal to one-billionth ($10^{-9}$) of the acceleration due to gravity at the earth's surface.

The sensitivity of gravimeter devices drifts approximately linearly over time. The drift rate is a strong function of device temperature. Because of this drift, these gravimeter devices may only be used for relative or differential measurements of acceleration due to gravity (referred to hereinafter as "gravity").

Differential gravity measurements may be used for borehole measurements. For example, two or three measurements may be taken in rapid succession and in close proximity to each other. The first measurement may be taken at some position in the borehole. A second measurement may be taken some distance $\Delta z$ above or below the first measurement. A third measurement may be taken at the same position as the first measurement. The first two measurements are subtracted and a drift correction applied. The drift correction may be determined from the difference between the first and third measurements and the timing of all three measurements.

In addition to providing a technique for correcting for drift, the differential measurement may be useful for calculating the average bulk density of a theoretical, horizontal, infinite slab located between the two measurement positions at z and z–$\Delta z$. The equation for bulk density, $\rho$, as measured via borehole gravimetry is:

$$\rho = 3.701 - 12\left(\frac{\Delta g}{\Delta z}\right) \quad \text{Equation 1}$$

where $\Delta g$ is the difference between two gravity measurements taken at two different vertical positions and $\Delta z$ is the measured vertical separation between the two measurements. In this formulation, $\rho$ is in units of g/cm$^3$, $\Delta g$ is in mGal, and $\Delta z$ is in meters.

As illustrated in Equation 1, the bulk density is dependent upon both gravity and vertical distance measurements.

Accordingly, the precision of the bulk density calculation depends on the precision of these two measurements.

A simple method for measuring vertical distance is to use an odometer at the surface to record the amount of wireline cable spooled in or out of a winch as the logging tool is moved from a first logging position for the first measurement to a second logging position for the second measurement and then back to the first logging position for the third measurement. This measurement can be adjusted by cosine ($\theta$) in the case of a deviated well in order to obtain the true vertical depth, where $\theta$ is the angle of the well with respect to the vertical. However, this method is limited by the precision of the odometer or other device measuring the cable movement and by stretch in the cable. The measurement of $\Delta z$ may also be affected by error in the measurement of $\theta$, which is usually measured with an inclinometer in the logging tool or obtained from the drilling records.

For a short $\Delta z$ of a few meters, a separate internal elevator or shuttle mechanical device (e.g., a conveyance mechanism) with a very precisely known travel distance may be used. The conveyance mechanism is inside the tool's pressure housing and has the gravimeter rigidly connected to it. One example of such a borehole gravity tool was built by LaCoste & Romberg in 1980 for the U.S. Geological Survey (USGS) and Atlantic-Richfield Company (ARCO), and has a conveyance mechanism with a travel distance of three meters. The main disadvantage with the use of such an internal conveyance mechanism is that it is limited to a relatively short $\Delta z$. It also adds to the length and cost of the downhole tool in which it is placed. Using an internal conveyance mechanism may provide a measurement precision for $\Delta z$ of approximately one to three millimeters out of three meters.

With many downhole logging tools, the depth of investigation (i.e., the sensitivity of the measurement to a formation that is some distance in the horizontal plane away from a vertical borehole) is related to and of the same magnitude as the source to receiver spacing. For compensated logging tools based on resistivity or gamma-gamma density, this is the spacing between the source and the primary or compensating detector and for the gravimeter it is the spacing, $\Delta z$, between the two measurements. For some applications of borehole gravimetry, such as water flood or gas cap monitoring in a hydrocarbon reservoir, it may be desirable to sense changes in gravity at relatively large distances (e.g., tens to hundreds of meters) from the borehole. In these cases, it may not be practical to have a conveyance mechanism with the necessary travel length inside a downhole tool.

For scenarios dealing with a larger $\Delta z$, various conventional methods known in the art may be used. For example, in cased holes, it may be possible to locate the casing collars by their increased magnetic permeability using a casing collar locator (CCL) tool. From the known length of the casing sections, $\Delta z$ may be obtained when the gravity measurements are taken at the casing collars. However, this method may be limited in precision by the measurement of the lengths of casing sections and the assumed overlap of casing joints, by casing sections stretching or compressing unevenly over time in the presence of subsidence or tectonic forces, and/or by the length of the casing collar itself, which may be ten to twenty centimeters long and may not give a repeatable indication of its position on the CCL log. The requirement in this method to locate the gravity measurement at the casing collar is severely limiting and may reduce the value of the measurement.

An alternative to the use of a CCL tool for determining $\Delta z$ includes the use of gamma-ray logs. A position in an open or cased well may be precisely located (e.g., within five to fifteen centimeters) by a gamma-ray log, but should still be correlated to some other measurement of length, such as the winch mounted odometer described previously.

Another alternative for determining $\Delta z$ involves using the difference in hydrostatic pressure of the fluid column within the borehole at the two measurement positions. An advantage of this method is that it may have no sensitivity to inclination and changes in inclination along the well path. It may be sensitive only to the true vertical separation, $\Delta z$, which is needed for the gravimeter-based bulk density measurement. Furthermore, it may be suitable for a large $\Delta z$ that is limited in length only by the pressure sensor's dynamic range and may be used for a smaller $\Delta z$ to the extent allowed by the precision of the pressure measurement. However, the method may be limited due to the precision of the pressure measurement itself (e.g., approximately seven kPa or one psi) and from variations in the fluid density that may exist between the two measurement positions.

The following disclosure describes embodiments of a method and apparatus for measuring multiple vertical positions within a borehole and the application of such measurements to measurement types such as borehole gravimetry. The disclosure describes embodiments directed to time-lapse reservoir monitoring, with a method and apparatus that may reduce the dependence on an accurate measurement of $\Delta z$ and focus instead on the repeatability or precision of $\Delta z$. Accordingly, the proposed method may use precise indexing of fixed positions within the borehole while logging a borehole for a first time, followed by precise relocation of these same fixed positions during subsequent logs of the same borehole. According to embodiments of this method, any measurement of $\Delta z$ may be limited in its accuracy by the accuracy of the distance and inclination measuring devices, but the interval may be precisely reproduced over later periods (e.g., year after year) of time-lapse logging.

Figure 1B:
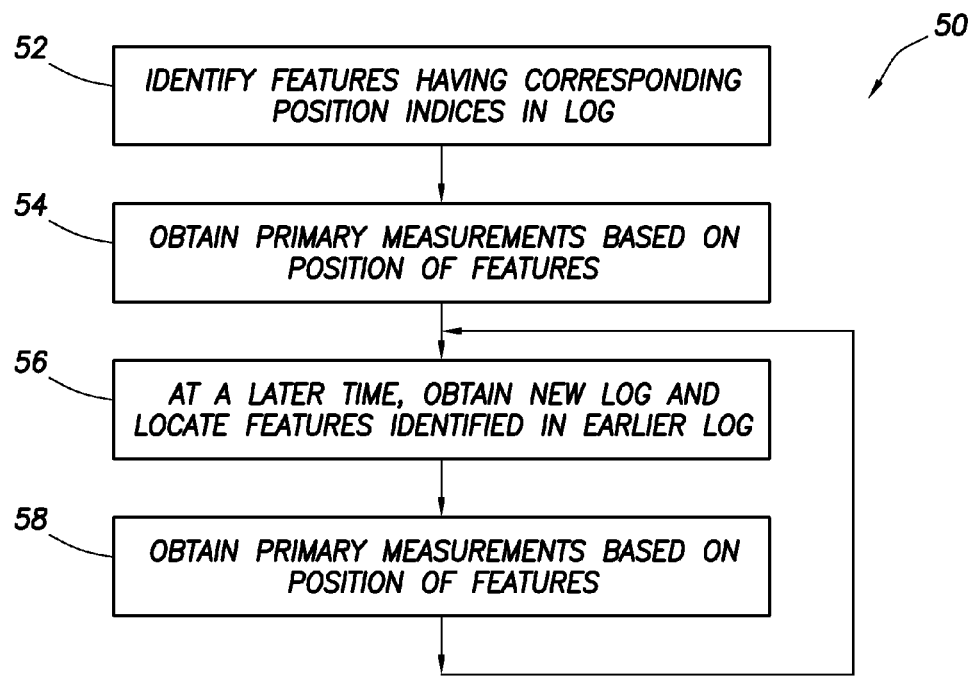
FIG. 1B is a flow chart diagram of at least a portion of a method according to one or more aspects of the present disclosure.

FIG. 1B is a flow-chart diagram of at least a portion of a method 50 according to one or more aspects of the present disclosure. The method 50 may be or comprise a process for using the location of identifiable features as indices for borehole measurements made by a designated primary measurement device. In the present example, the primary measurement device is a gravity measurement device used for taking gravity measurements, but it is understood that many other devices and measurement types may be used in addition to or in place of the gravity measurement device. Accordingly, while the present disclosure refers to gravity measurement devices and gravity measurements for purposes of illustration, the present disclosure is not limited to gravity applications.

In step 52, features (described later in greater detail) are identified in a log obtained via a downhole logging tool. Each feature corresponds to an indexed distance position that enables the tool to precisely position a primary measurement device (e.g., a gravity measurement device) relative to that feature. In step 54, gravity measurements are made based on the position of the features using the positioned gravity measurement device. In step 56, at a later time (e.g., days, weeks, months, or years later), a new log is obtained via a downhole logging tool and the identified features from the earlier log are again identified. A gravity measurement device in the tool can again be precisely positioned relative to the features in substantially (e.g., within a defined margin of error) the same position as the gravity measurement device used in the earlier gravity measurements. In step 58, new gravity measurements may be made based on the position of the features, and these gravity measurements have a high correlation to the earlier gravity measurements based on the precise positioning of the gravity measurement device. This process may be repeated to obtain multiple time-lapse logs that may be closely correlated due to the precise indexed positioning of the gravity measurement devices.

The first log may record a measurement of a bulk density at time, $t_0$, per Equation 1, which is represented as:

$$\rho_{0i} = K_1 - K_2 \left( \frac{\Delta g_{0i}}{\Delta z_i} \right) \quad \text{Equation 2}$$

Equation 2 may be rewritten to solve for $\Delta z_i$ as follows:

$$\Delta z_i = K_2 \left( \frac{\Delta g_{0i}}{K_1 - \Delta \rho_{0i}} \right) \quad \text{Equation 3}$$

The first index of $\rho$ and $\Delta g$ represents the first or subsequent of multiple time-lapse measurements and is generalized by the index, t. The second index, i, represents multiple measurements along the well path. $\rho_{ti}$ and $\Delta g_{ti}$ change with time but $\Delta z_i$ does not. With data from a subsequent log, the change in bulk density, $\Delta \rho_{1i}$ may be calculated over the time interval $\Delta t_i = t_1 - t_0$ and the vertical interval $\Delta z_i$ as:

$$\Delta \rho_{1i} = \rho_{1i} - \rho_{0i} = K_2 \left( \frac{\Delta g_{1i} - \Delta g_{0i}}{\Delta z_i} \right) \quad \text{Equation 4}$$

Values for $\Delta z_i$ may be determined using various methods. A first method may be used that calculates $\Delta z_i$ from Equation 3 using known values of $\rho_{0i}$ obtained from another measurement. A second method may use a direct and independent measurement of $\Delta z_i$ that relies on the same position referencing scheme disclosed herein. A third method may use a gravity gradiometer instead of a differential gravimeter, in which case $\Delta z_i$ need not be known.

In the first method, values of $\rho_{0i}$ (note t=0 is the first in the series of time-lapse measurements) are obtained from known conventional well logs including, for example, gamma-gamma density logs and core data or from a reservoir model, which may, in turn, be derived in part from conventional well logs and core data. $\rho_{0i}$ may also be obtained from a set of gravity measurements taken with the conveyance mechanism internal to the downhole tool, where the conveyance mechanism has a $\Delta z_i$ of a few meters. Averages may be computed for subsets of the resultant set of $\rho_{0i}$ data with small $\Delta z_i$ to create a set of $\rho_{0i}$ data with large $\Delta z_i$. From these values of $\rho_{0i}$ and the measured values of $\Delta g_{0i}$, $\Delta z_i$ may be calculated for all vertical intervals using Equation 3. These values of $\Delta z_i$ may be used in the calculation of all future time-lapse measurements of $\Delta \rho_{ti}$.

In the second method, the same high precision position indexing described in the previous section is used. An independent technique for measuring $\Delta z_i$ may be applied based on the fact that measurements of hydrostatic pressure at the same positions as the gravity measurements can be used to determine $\Delta z_i$ via the well known equation:

$$P = \rho g h \quad \text{Equation 5}$$

where h is the height of the fluid column, P is the hydrostatic pressure at the base of the fluid column and $\rho$ is the density of the fluid in the column.

By taking the difference of pressure measurements taken at two points within the fluid column, the vertical separation between the two points may be determined according to the equation:

$$\Delta z_i = \frac{\Delta P_i}{\rho_f \cdot g} \quad \text{Equation 6}$$

where $\Delta P$ equals the difference in pressure between two positions separated by a vertical distance $\Delta z_i$, $\rho_f$ is the borehole fluid density, and g is the computed average acceleration due to gravity for that vertical depth. For this purpose, the absolute, not differential, value of g is used with the free air correction appropriate for the depth applied. With respect to Equation 6, it is noted that $\Delta z_i$ is always the true vertical distance between the two points, regardless of the shape or path of the borehole, so there is no need to correct for well inclination, $\theta$. A refinement to this measurement may use a continuous log of fluid density obtained from an x-ray densitometer, for example, instead of a single value. Other techniques that may be used for independently determining $\Delta z_i$ include an odometer (which is not considered as accurate) and acoustic, laser, or microwave range-finders (which may not be available for borehole applications). The odometer and range-finder may need a measurement of inclination, which is an additional source of error.

In some embodiments of this second method, $\Delta z_i$ may be measured only once for the entire time-lapse series. However, this entails use of the high precision position indexing described herein. Alternatively, $\Delta z_i$ may be measured for each time-lapse interval, such that $\Delta z_i$ becomes $\Delta z_{ti}$ and may be different for each time-lapse interval.

In the third method, a gravity gradiometer is used in place of the differential gravimeter so that determination of $\Delta z_i$ is not needed. The gradiometer measures $(\Delta g / \Delta z)_i$, the gravity gradient, directly. The high precision position indexing described herein may benefit a gradiometer measurement when used for time-lapse monitoring. Precisely repeating gradiometer measurement stations throughout a time-lapse series ensures that time-lapse differences of gravity gradient are not reduced in precision due to poor station repeatability.

Figure 1C:
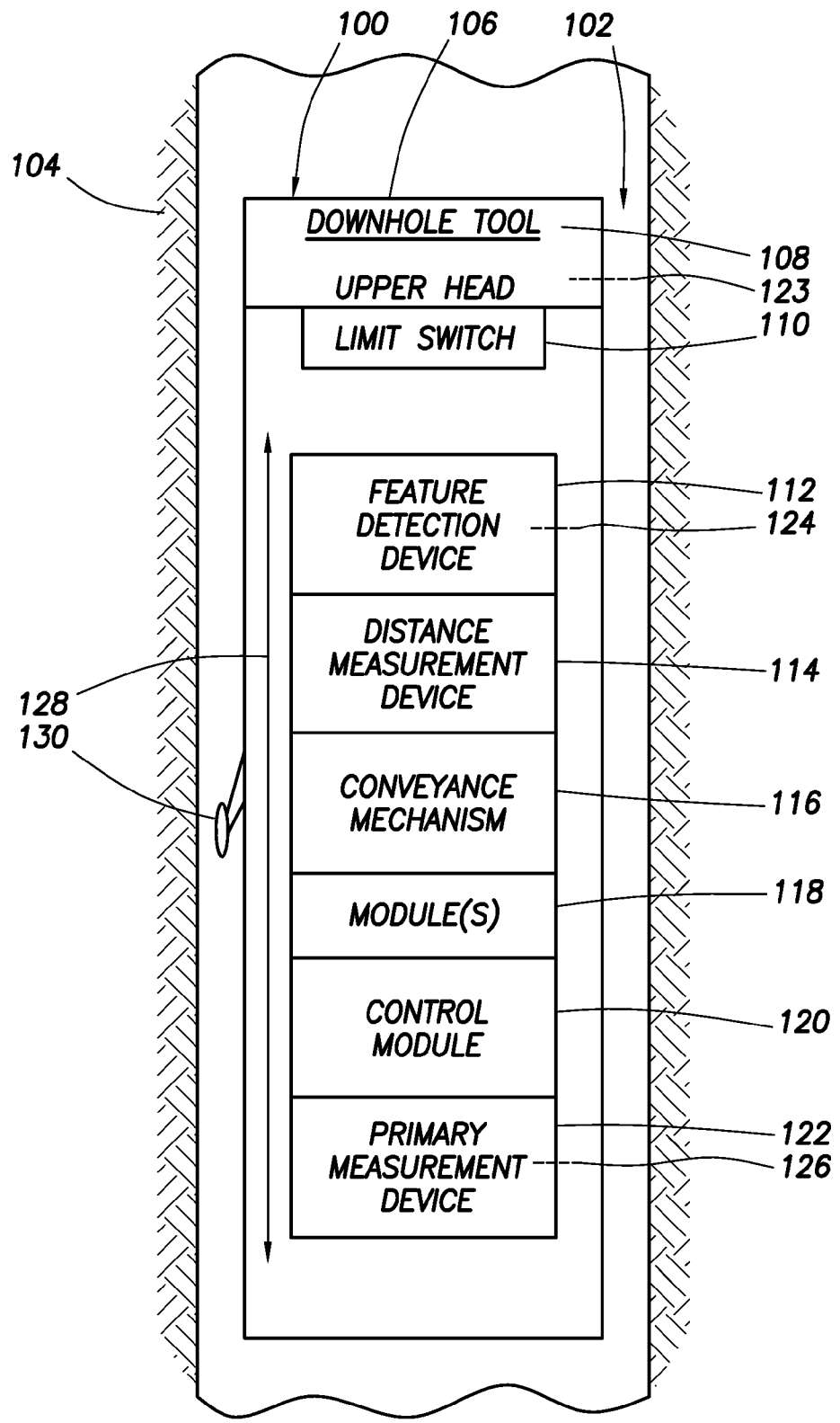
FIG. 1C is a schematic view of apparatus according to one or more aspects of the present disclosure.

FIG. 1C is a schematic view of a downhole tool 100 according to one or more aspects of the present disclosure. The tool 100 may be used in a borehole 102 formed in a geological formation 104, and may be conveyed by wireline, drill-pipe, tubing, and/or any other means (not shown) used in the industry. The tool 100 comprises a housing 106 that contains multiple components configured to obtain primary (e.g., gravity) measurements that are indexed relative to features of the borehole 102 to provide data usable with, for example, the method 50 of FIG. 1B.

The features for indexing may be man-made or naturally occurring. In the present embodiment, a feature may need to satisfy one or more criteria in order to be categorized as a usable feature for purposes of the present disclosure. For example, the feature may be required to persist for the expected duration of the time-lapse monitoring. The feature may be required to be detectable within the sensitivity and resolution of a feature detection instrument. The feature may be required to be distinguishable from other similar features either by its position within the borehole or by aspects of its detected signal. The feature may be required to be at or relative to a local maximum, local minimum, or step-change in the physical property being detected as a function of longitudinal position. The feature may be required to have a longitudinal extent with an order of magnitude commensurate with the required precision of the application. It is understood that a feature for a particular application may be required to meet some or all of these criteria. Furthermore, other criteria may be required in addition to, or as alternatives of, the above described criteria.

Examples of naturally occurring features that may be suitable include, but are not limited to, variations or transitions in radioactivity, density, porosity, fluid saturation, lithology, dip, anisotropy, electrical conductivity, dielectric constant, inductance, temperature, acoustic velocity, decay of Nuclear Magnetic Resonance (NMR) response, neutron or gamma-ray absorption or scattering cross-sections, thermal neutron decay time, spectral or cumulative gamma-ray emission due to neutron activation, mechanical structure, magnetic flux, and magnetic permeability. Additional naturally occurring and detectable features are fractures, faults, and vugs in the rock of the formation 104.

Examples of manmade features created during drilling that may be suitable include, but are not limited to, variations or transitions in the borehole diameter and cross-sectional shape that occur during or shortly after drilling. These are generically referred to as rugosity and are created by washouts and breakouts, changes in drill bit size, corkscrewing, reaming, bit wear, changes in rock hardness, changes in drilling speed and weight on bit, and changes in mud weight and pressure. The drilling process may also result in changes in mud cake thickness, composition, and depth of penetration into the formation.

Examples of manmade features created during well completion that may be suitable include, but are not limited to, variations or transitions in cement thickness, density and composition, voids in cement, and aspects of the casing and production tubing such as composition, thickness, joints, collars, gaps in joints, perforations, changes in casing and tubing size, and defects such as voids, scratches, gouges, inclusions, pits, corrosion, scaling and welding defects. Other hardware that is part of the completion may also provide a detectable feature and includes radioactive "pip" tags, casing shoes, hangers, nipples, valves, packers, sand screens, gravel packs, kick-offs, multiple tubing transitions, and any item in the completion hardware or process introduced specifically for the purpose of precision position indexing.

Manmade features introduced after well completion for the specific purpose of precision indexing may be generically referred to as tags. Any item of material with a physical property different from the surrounding casing, tubing, cement, or formation may serve as a suitable tag. The different physical properties include, but are not limited to radioactive, nuclear, magnetic, electrical, inductive, acoustic, thermal, optical, and NMR properties. The difference in physical properties may be a simple change in shape such as introduced gouges, scratches, bosses, and depressed features in the casing, tubing, or formation.

Manmade features introduced after well completion may be created or applied in a number of ways. One way includes the use of an adhesive that adheres to a solid form, contains in suspension a powder or in solution or mixture a liquid form, or consists of the material with special properties. Another way includes drilling a hole into or through the casing, tubing, or formation and inserting a plug that consists of, contains, or has the material with special properties adhered to it. Yet another way includes firing a bullet with a charge into or through the casing, tubing, or formation where the bullet consists of, contains, or has the material with special properties adhered to it. Still another way includes installing an expansion ring or clamp that consists of, contains, or has the material with special properties adhered to it. Gouges, scratches, bosses, and depressed features may be created in the casing, tubing, or formation using an appropriate mechanical device such as an awl, hammer, press, or drill adapted for downhole use and remotely operable.

In the present example, the tool 100 is oriented with an upper head 108 positioned as the "top" of the tool when the tool is oriented in a substantially vertical manner. It is understood that the term "top" is relative and used for purposes of illustration only, and may not be located at the top in horizontal wells. A limit switch 110 may be positioned near or adjacent to the upper head 108.

The tool 100 may also include a feature detection device 112, a distance measurement device 114, a conveyance mechanism 116, one or more other modules 118, a control module 120, a primary measurement device 122 (which is a gravity measurement device in the present example), and an anchoring mechanism 130. It is understood that the tool 100 may be a module of a larger tool (not shown) and that various components described below may be positioned in other modules rather than in the tool 100. For example, the control module 120 may be positioned elsewhere. Furthermore, the order of the modules shown may be rearranged. Fiducial marks 123, 124 and 126 may be used for calibration, as will be described later.

The feature detection device 112 may be able to withstand the rigors of downhole use and capable of detecting the features in a timeframe suitable for operational purposes. The feature detection device 112 may be based on one or more measurement types. Examples of measurement types that may be the basis of the feature detection device 112 include active electrical induction, passive magnetic flux, passive gamma-ray, active gamma-gamma or x-ray density, active x-ray imaging, active acoustic imaging, active acoustic velocity, and active acoustic caliper.

A feature for indexing may or may not extend over the full circumference of the borehole 102. Accordingly, the feature detection device 112 may have simultaneous coverage of the full circumference of the borehole 102 or may detect only a portion of the azimuth at one time. The coverage of the feature detection device 112 may depend on the position, size, and shape of the feature to be detected, the principle of operation and implementation of the feature detection device 112, and the method of deployment and installation of the feature detection device 112 within the tool 100. In scenarios where the feature has limited azimuthal extent and the feature detection device 112 has limited azimuthal sensitivity, it may be advantageous to rotate the feature detection device 112 or the portion of the downhole tool 100 containing the feature detection device 112 about the longitudinal axis of the tool 100 or to install multiple feature detection devices 112 circumferentially about the longitudinal axis of the tool 100 to ensure full azimuthal coverage.

In some embodiments, due to details of the feature or the feature detection device 112, it may be beneficial to have the feature detection device 112 as close as possible to the wall of the borehole 102 or to have the feature detection device 112 centered within the borehole 102. Accordingly, appropriate measures in the design of the feature detection device 112, the tool 100, and/or auxiliary equipment may be taken to optimize the operation of the feature detection device 112. For example, a centralizer or eccentralizer may be used as auxiliary equipment with the tool 100 or incorporated within the tool 100. The feature detection device 112 may be mounted on a protruding feature of the tool 100 or on an extendible pad of the tool 100.

The distance measurement device 114, which is to precisely measure the distance traveled by the conveyance mechanism 116 within the tool 100, may be of multiple types. For example, the distance measurement device 114 may be an optical rotational encoder described in U.S. Pat. No. 5,970,787, which is hereby incorporated by reference in its entirety. Other types of distance measurement devices include a laser or other light source rangefinder with separated source and receiver or with a light reflector and co-located source and receiver, an acoustic rangefinder with separated source and receiver or with an acoustic reflector and co-located source and receiver, and a radio frequency rangefinder with separated source and receiver or with a radio frequency reflector and co-located source and receiver. Accordingly, any device capable of precisely measuring the distance traveled by the conveyance mechanism 116 within the tool 100 may be used as the distance measurement device 114.

In the present example, the conveyance mechanism 116 enables movement of certain components within the housing 106 along a longitudinal axis of the tool 100 in two directions as indicated by line 128. The feature detection device 112 and the gravity measurement device 122 may be coupled to the conveyance mechanism 116 so that the feature detection device 112 and the gravity measurement device 122 move simultaneously with one another and remain a fixed distance apart. The distance measurement device 114 may also be coupled to the conveyance mechanism 116.

The particular conveyance mechanism 116 used in the tool 100 may depend on such factors as the positioning precision required by the gravity measurement device 122, speed of movement, length of longitudinal travel, amount of shock and vibration tolerable by the feature detection device 112 and gravity measurement device 122, borehole diameter, amount of space available in the tool 100, amount of maximum borehole inclination and requirement of azimuthal rotation for the feature detection device 112 and gravity measurement device 122.

Examples of conveyance mechanisms include a gravity drive in the downward direction, a unidirectional or bidirectional winch, pulley and cable drive where bidirectionality is required for horizontal travel when gravity cannot provide the return force of the mechanism, a motorized lead screw drive, a motorized scissor with lead screw drive, a unidirectional or bidirectional hydraulic piston, a unidirectional or bidirectional telescoping mechanism with motorized or hydraulic drive, a motorized rack and pinion drive and a variety of tractor mechanisms. The tractor mechanisms may include pairs of cam and claw mechanisms with piston or lead screw drives (i.e., "inch-worm"), belt and pad mechanisms (i.e., "caterpillar"), and powered wheels. One embodiment of a tractor is described in previously incorporated U.S. Pat. No. 5,970,787.

In some embodiments, the conveyance mechanism 116 may be internal to the housing 106 of the tool 100 along with various instruments (e.g., the feature detection device 112, distance measurement device 114, and gravity measurement device 122), in which case the travel distance is limited to the length of the housing 106 minus the length occupied by the instruments, conveyance mechanism 116, and other elements positioned within the housing 106. In other embodiments, the conveyance mechanism 116 may be external to the housing 106, in which case it should be designed to withstand the borehole environment, but is not limited in travel distance by the housing length.

The gravity measurement device 122 may be any suitable gravimeter or gravity gradiometer, such as a LaCoste and Romberg gravity sensor, which is ruggedized, temperature controlled, and contained in a sealed pressure housing designed for downhole use. One possible embodiment of the gravity measurement device 122 is described in previously incorporated U.S. Pat. No. 5,970,787.

The control module 120 may be in wireless and/or wired signal communication with one or more of the feature detection device 112, distance measurement device 114, conveyance mechanism 116, modules 118, gravity measurement device 122, and anchoring mechanism 130. The control module 120 may also be in signal communication with one or more components (not shown) positioned outside of the tool 100 in the borehole and/or outside of the borehole 102 on the surface.

The anchoring mechanism 130 operates to prevent movement of the downhole tool 100 within the borehole 102 when engaged. Generally, the tool 100 may experience movement within the borehole 102 after the winch controlling and supporting the cable to which the tool 100 is attached has stopped. In a vertical borehole, the motions of the tool 100 may include swinging from one side of the borehole 102 to the other (i.e., a pendulum-like motion). The tool 100 may undergo a repeated up and down motion (i.e., "yo-yoing") due to the spring and mass nature of the cable and tool 100 where the elasticity of the cable provides the spring. The tool 100 may vibrate due to surface vibrations from, for example, the winch motor or other motors on the rig floor being transmitted via the cable. The tool 100 may undergo gradual movement up or down the borehole 102 (i.e., "creep") due to gradually overcoming the force of friction between the borehole 102 and tool 100 and cable via the opposing force of tension in the cable (upward movement) or weight of the tool 100 (downward movement). The tool 100 may undergo sudden movement up or down the borehole 102 (i.e., "stick-and-slip") due to the same root causes as creep. The tool 100 may undergo rotation (i.e., "corkscrewing") due to the relaxation of torsion in the cable. In a horizontal or deviated hole, these movements may be reduced or eliminated due to the weight of the tool 100 resting on the lower side of the borehole wall.

Any of these movements may reduce the repeatability of the precision position indexing being sought. In particular, movement along the longitudinal axis of the borehole 102 due to creep, yo-yoing, or stick-and-slip may adversely affect repeatability. The anchoring mechanism 130 may be used to minimize or eliminate these movements, and may be in the form of one or more anchors, clamps, eccentralizers, centralizers, or other devices rigidly attached to the tool 100 or incorporated into the tool 100. The anchors, clamps, or eccentralizers may mechanically force one or more pads, levers, or springs against one side of the borehole 102 and the tool 100 against the opposite side of the borehole 102. The centralizers, usually used in pairs, may mechanically force against a wall of the borehole 102 three or more pads, levers, or springs that are evenly distributed about the circumference of the tool 100 and may thereby rigidly support the tool 100 at the center of the borehole. It is understood that the effectiveness of any anchoring mechanism may depend on the relative values of anchoring force, weight of the tool 100, cable weight, and cable tension. Where sufficient anchoring force is available, it may be desirable to slacken the cable to reduce the transmission of surface vibration to the tool 100.

In operation, the tool 100 may be used to provide precise positioning for the gravity measurement device 122 positioned within the tool. For example, the tool 100 may be used to enable a method for finding a position deep within the borehole 102 to a precision of several millimeters and then relocating that same position some time later (e.g., days, weeks, months, or years) to the same several millimeters precision. As will be described in detail below, this may be accomplished by moving the feature detection device 112 across the feature while compiling a log and then returning the feature detection device to a selected position at or relative to the feature based on measurements in the log provided by the feature detection device 112 and the distance measurement device 114. A gravity measurement may then be taken by the gravity measurement device 122 when the feature detection device 112 is aligned relative to the feature.

The tool 100 may be deployed and operated in combination with other tools to form a tool string in the case of wireline, coiled tubing or tractor conveyance and a bottom-hole assembly in the case of Logging While Drilling. For example, in the case where the primary measurement device 122 of tool 100 is a borehole gravity measurement device, it may be combined with one or more of a borehole seismic measurement tool, a borehole, surface-to-borehole or cross-well electromagnetic measurement tool and a formation pressure measurement tool, for the purpose of obtaining a suite of deep reading measurements as described in U.S. Patent Application Publication No. 2009/0164187, which is hereby incorporated by reference in its entirety. Combinations of tools may be constructed on the basis of a common need to take measurements only while the tool string is stationary (so-called station measurements), on the basis of a common need for precision position indexing, on the basis of a common purpose for the set of measurements (such as for reservoir model construction), on the basis of comparing measurements with redundancy such as gravity-derived density and gamma-gamma density, on the basis of scheduling of borehole access, combinations of the aforementioned bases or any other basis determined by a user of the tool 100.

Figure 2A:
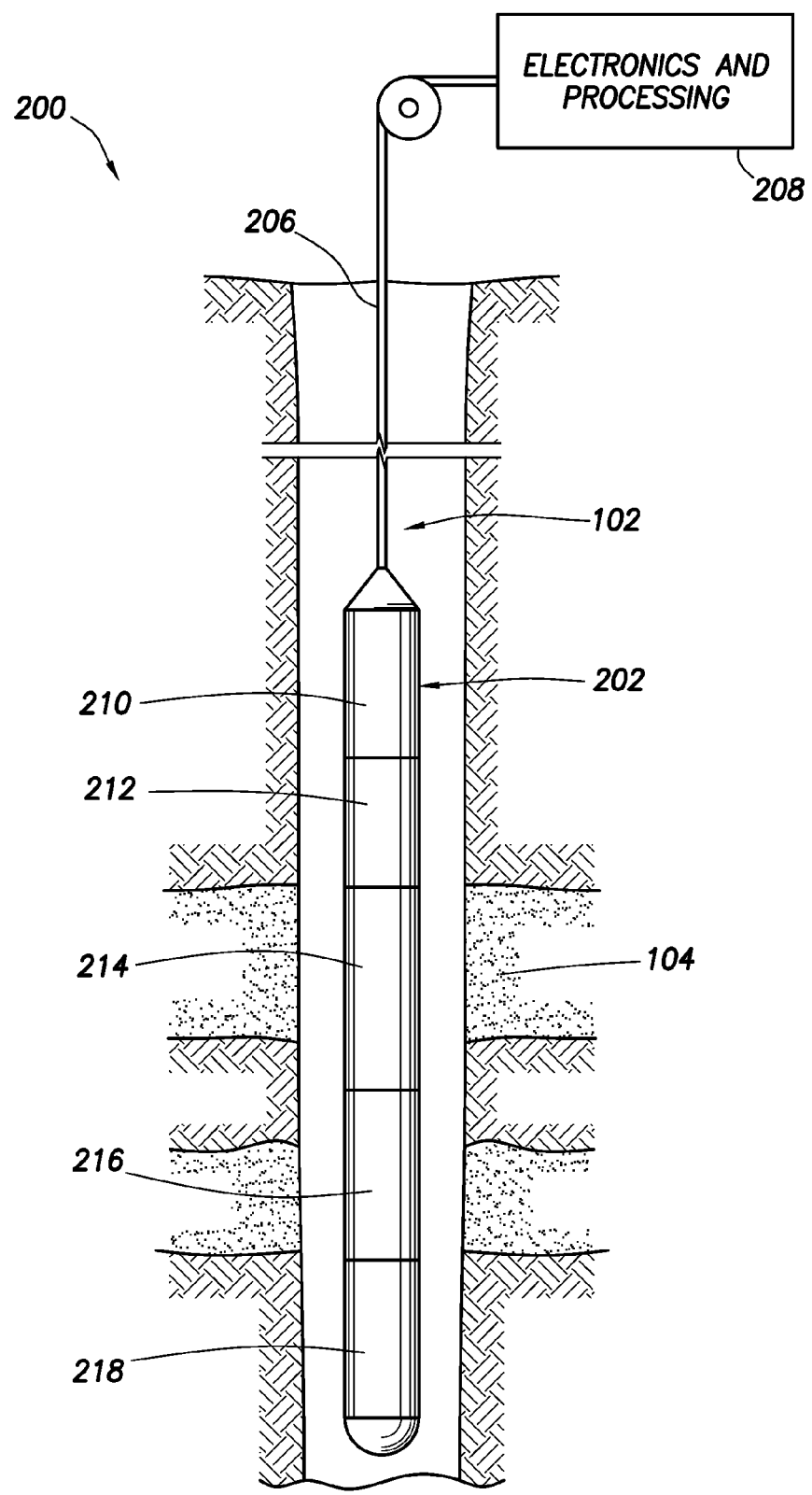
FIG. 2A is a schematic view of apparatus according to one or more aspects of the present disclosure.

FIG. 2A is a schematic view of apparatus according to one or more aspects of the present disclosure, including one embodiment of an environment 200 with a wireline tool 202 in which aspects of the present disclosure may be implemented. The wireline tool 202 may be similar or identical to the downhole tool 100 of FIG. 1C. The wireline tool 202 is suspended in a borehole 102 from the lower end of a multi-conductor cable 206 that is spooled on a winch (not shown) at the Earth's surface. At the surface, the cable 206 is communicatively coupled to an electronics and processing system 208. The wireline tool 202 includes an elongated body 210. Additional modules 212, 214, 216 and 218 (e.g., components described above with respect to FIG. 1C) may also be included in the tool 202. In the illustrated example, the electronics and processing system 208 and/or a downhole control system (e.g., the control module 120 of FIG. 1) may be configured to control various components of the tool 202.

Figure 2B:
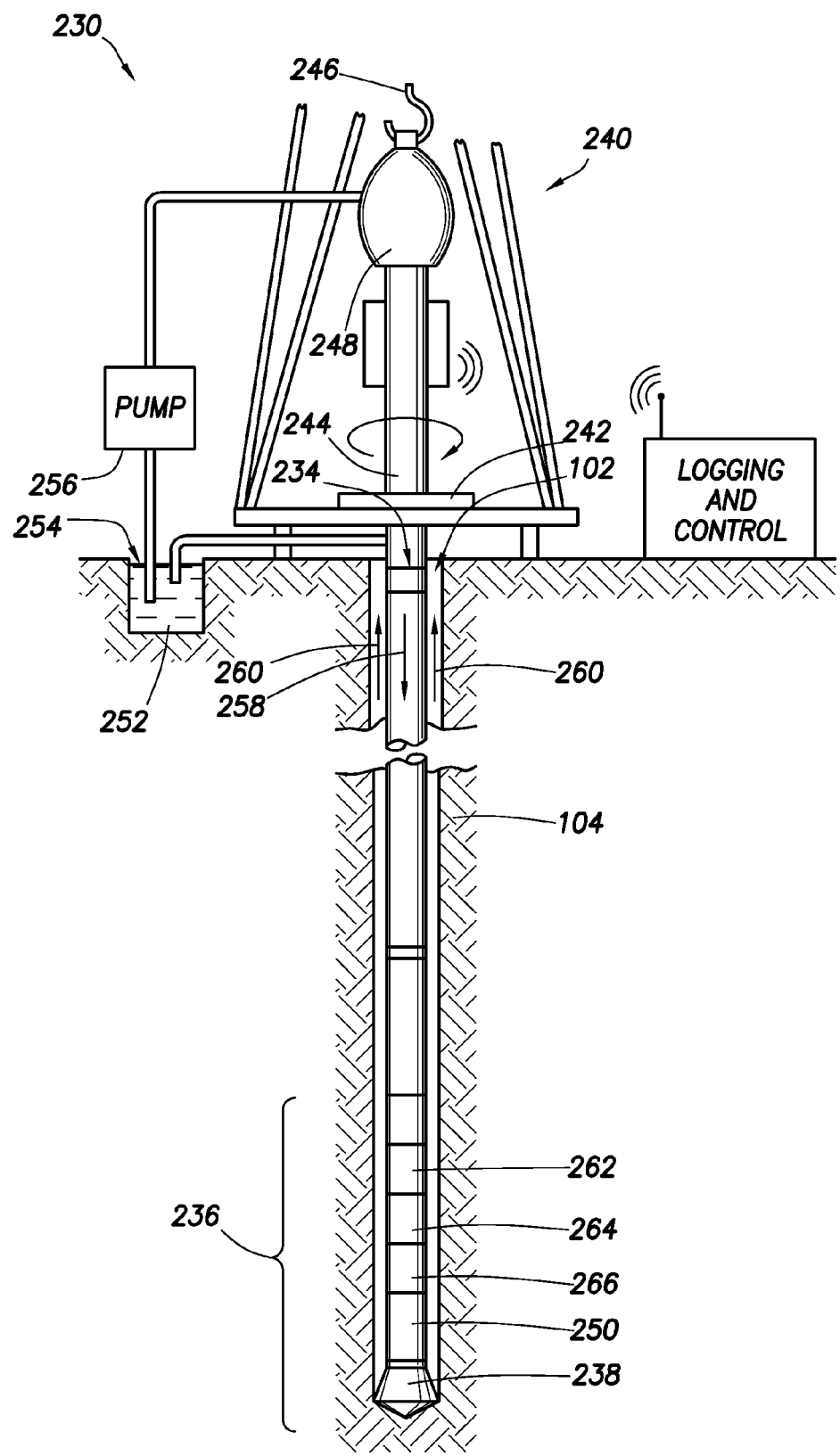
FIG. 2B is a schematic view of apparatus according to one or more aspects of the present disclosure.

FIG. 2B is a schematic view of apparatus according to one or more aspects of the present disclosure, including one embodiment of a wellsite system environment 230 in which aspects of the present disclosure may be implemented. The wellsite can be onshore or offshore. A borehole 102 is formed in subsurface formations (e.g., the formation 104 of FIG. 1C) by rotary drilling and/or directional drilling.

A drill string 234 is suspended within the borehole 102 and has a bottom hole assembly 236 that includes a drill bit 238 at its lower end. The surface system includes platform and derrick assembly 240 positioned over the borehole 102, the assembly 240 including a rotary table 242, kelly 244, hook 246 and rotary swivel 248. The drill string 234 is rotated by the rotary table 242, energized by means not shown, which engages the kelly 244 at the upper end of the drill string. The drill string 234 is suspended from the hook 246, attached to a traveling block (also not shown), through the kelly 244 and the rotary swivel 248, which permits rotation of the drill string relative to the hook. As is well known, a top drive system could alternatively be used.

The surface system further includes drilling fluid or mud 252 stored in a pit 254 formed at the well site. A pump 256 delivers the drilling fluid 252 to the interior of the drill string 234 via a port in the swivel 248, causing the drilling fluid to flow downwardly through the drill string 234 as indicated by the directional arrow 258. The drilling fluid 252 exits the drill string 234 via ports in the drill bit 238, and then circulates upwardly through the annulus region between the outside of the drill string and the wall of the borehole 102, as indicated by the directional arrows 260. In this well known manner, the drilling fluid 252 lubricates the drill bit 238 and carries formation cuttings up to the surface as it is returned to the pit 254 for recirculation.

The bottom hole assembly 236 may include a logging-while-drilling (LWD) module 262, a measuring-while-drilling (MWD) module 264, a roto-steerable system and motor 250, and drill bit 238. The LWD module 262 may be housed in a special type of drill collar, as is known in the art, and can contain one or more known types of logging tools. It is also understood that more than one LWD and/or MWD module can be employed, e.g., as represented by LWD tool suite 266. (References, throughout, to a module at the position of 262 can alternatively mean a module at the position of 266 as well.) The LWD module 262 (which may be similar or identical to the tool 100 shown in FIG. 1C or may contain components of the tool 100) may include capabilities for measuring, processing, and storing information, as well as for communicating with the surface equipment. In the present embodiment, the LWD module 262 includes measurement devices, such as those described with respect to FIG. 1C.

The MWD module 264 may also be housed in a special type of drill collar, as is known in the art, and can contain one or more devices for measuring characteristics of the drill string 234 and drill bit 238. The MWD module 264 further includes an apparatus (not shown) for generating electrical power to the downhole system. This may typically include a mud turbine generator powered by the flow of the drilling fluid, it being understood that other power and/or battery systems may be employed. The MWD module 264 may include one or more of the following types of measuring devices: a weight-on-bit measuring device, a torque measuring device, a vibration measuring device, a shock measuring device, a stick/slip measuring device, a direction measuring device, and an inclination measuring device.

Figure 3:
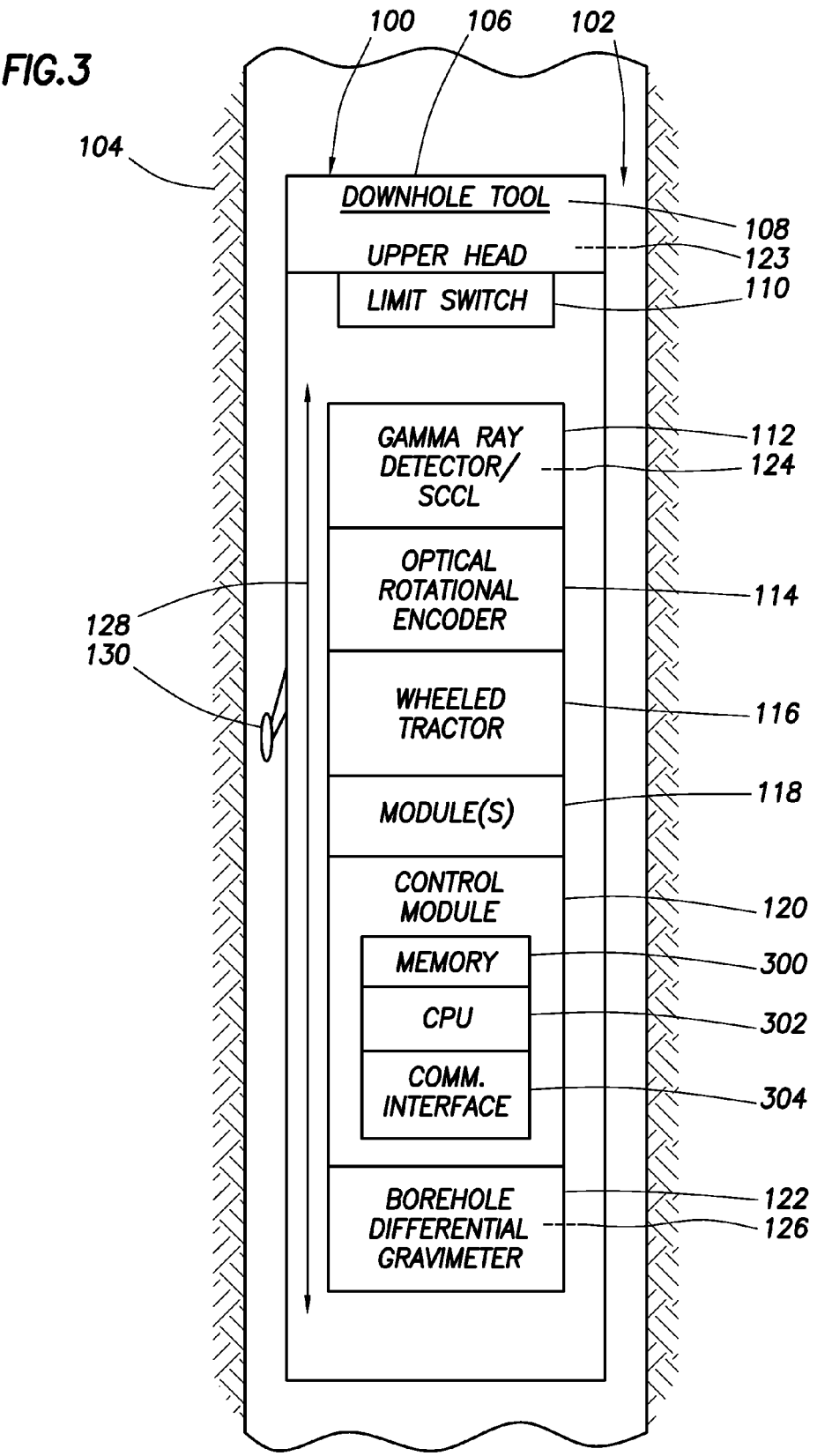
FIG. 3 is a schematic view of apparatus according to one or more aspects of the present disclosure.

FIG. 3 is a schematic view of an embodiment of the downhole tool 100 of FIG. 1 according to one or more aspects of the present disclosure. In the present example, the feature detection device 112, distance measurement device 114, conveyance mechanism 116, primary measurement device 122, and anchoring mechanism 130 are described in greater detail with respect to a particular implementation of the tool 100.

Referring also to FIG. 4, a schematic view of an embodiment of a portion of the tool 100 of FIG. 3 is illustrated according to one or more aspects of the present disclosure. In the present embodiment, the conveyance mechanism 116 is a wheeled tractor 400 having a housing 401 rigidly attached along with some intervening components to the gravity measurement device 122 and capable of transporting itself, the gravity measurement device 122, electronics, and other elements bi-directionally for a distance of two meters along the line 128 within the tool 100. The tractor 400 is also rigidly attached to the feature detection device 112 so that the feature detection device 112 and the gravity measurement device 122 move up and down simultaneously while maintaining precisely the same separation distance. The tractor 400 may be coupled within the tool 100 via one or more mounting flanges 411.

For purposes of example, the wheeled tractor 400 may be driven by one or more stepper motors 402 moving 1.8° per step. The stepper motor 402 drives a worm 404 via an offset reduction gear 406 and the worm 404 drives two worm gears 408 on opposing sides of the worm 404. The two worm gears 408 in turn impart motion to two drive wheels 410 on opposing sides of the tractor 400 via idler gears (also denoted by numeral 408) on each side. The gear ratio for the entire gear train may be 1/109.1, reducing. A holding force of the wheels 410 against the inside of the housing 106 is provided by a compressed spring (not shown) attached at either end of hinged arms supporting each wheel 410. A typical tractor speed along the longitudinal axis of the tool 100 may be 1.04 millimeters per second with 0.0042 millimeters of travel per single step of the stepper motor 402 (i.e., approximately 4 µm/step). This slow speed allows for the accumulation of feature detection data with a sufficient averaging of random noise in the detected signal to be able to locate the position of a feature with a precision of approximately six millimeters, where the limiting factor is the noise of the feature detection device 112. Greater precision may be obtained at slower tractor speeds.

With continued reference to FIG. 4, in the present embodiment, the distance measurement device 114 is an optical rotational encoder 412. The optical rotation encoder 412 has an encoder wheel 414 that travels up and down with the tractor 400 and rolls along the inside of the housing 106 in a manner similar to the drive wheels 410 of the tractor 400. For purposes of example, the encoder wheel 414 may be thirty-eight millimeters in diameter, may not be incorporated with the tractor 400 and its gear train, and may be mounted directly to the axle of an optical encoder having 1.4° resolution, which corresponds to a longitudinal distance resolution of one half millimeter (i.e., 0.018 inches). The encoder wheel 414 and encoder may be mounted to a hinged arm 416 with spring loading to provide friction between the encoder wheel 414 and the housing 106.

Referring also to FIG. 5, a schematic view of an embodiment of a portion of the tool 100 of FIG. 3 is illustrated according to one or more aspects of the present disclosure. In the present embodiment, the feature detection device 112 is a gamma-ray detector 500 having a housing 502 containing a photomultiplier tube 504, a thallium-doped sodium iodide scintillating crystal 506 positioned within a crystal housing 508, a high voltage power supply 510, and signal processing electronics 512. The detector 500 may be coupled within the tool 100 via one or more mounting flanges 514.

The gamma-ray detector 500 may be used in the tool 100 because it is a relatively simple detection instrument to implement and provides feature detection in virtually any borehole 102. The detector 500 detects gamma-rays emitted by uranium, thorium, or potassium naturally present in trace or larger amounts in most sub-surface formations. Gamma-ray detector countrates in a borehole generally range from one to three orders of magnitude and vary spatially with the geologic strata. Gamma-rays readily pass through steel and other materials and thus can be detected, with reduced efficiency, through casing, tubing, and other well completion hardware. These aspects ensure a high probability of identifying a detectable feature in cased or open hole and in close proximity to the desired position of a gravity measurement. Features in a gamma-ray log suitable for the purpose of precision position indexing are any change in the gamma-ray countrate with a magnitude of a few GAPI (where GAPI is a standard unit of gamma-ray countrate defined by the American Petroleum Institute and used in the oil and gas industry) or more, where the minimum threshold of detection may be dependent upon the travel speed of the tractor 400 and the detector's efficiency and solid-angle.

The gamma-ray detector 500 also provides a convenient feature detection instrument when using manmade markers attached or implanted in the completion hardware or formation. In this case, the marker may be radioactive or may have a high gamma-ray absorption or scattering cross-section such as lead. For example, a marker may be implanted using a bullet containing or composed of the marker material or device and propelled by an explosive charge. One example of such a marker material may be a U.S. Nuclear Regulatory Commission (NRC) exempt quantity of $^{137}$Cs in a small package that emits gamma-rays and can be detected with the gamma-ray detector 500. Alternatively, the marker may be a samarium-cobalt permanent magnet with its magnetization vector aligned with the bullet's longitudinal axis, which can be detected by a Hall-effect or other magnetometer. The bullet, when fired, may lodge in the casing or formation 104 and be permanently fixed in position throughout all time-lapse measurements. Locations for bullets may be selected to coincide with optimal positions for gravity measurements and in practice may only approximate the optimal location within the precision of a conventional cable odometer and standard gamma-ray correlation log.

In the present example, the feature detection device 112 may include an alternate or additional feature detection instrument (not shown) for use in cased holes where the gamma-ray log is sparse in features or low in magnitude. This alternate instrument may be a Stationary Casing Collar Locator (SCCL) as described in detail in U.S. Pat. No. 6,084,403, which is hereby incorporated by reference in its entirety. In contrast to a standard CCL, which is a passive detector of changes in magnetic flux and which has a signal amplitude that depends on travel speed, the SCCL is an active detector of induced magnetic fields and is suited for relatively slow travel speeds. The SCCL may detect with high spatial resolution features in the completion hardware such as gaps in casing joints.

Referring also to FIG. 6, a schematic view of an embodiment of a portion of the tool 100 of FIG. 3 is illustrated according to one or more aspects of the present disclosure. In the present embodiment, the gravity measurement device 126 is a borehole differential gravimeter 600 using a LaCoste and Romberg gravimeter, which is ruggedized, temperature controlled and contained in a sealed pressure housing designed for downhole use.

The gravimeter 600 includes an outer Dewar 602. Inside the outer Dewar 602 is a heater sleeve 604. The heater sleeve 604 slips over an inner Dewar 606 and a printed circuit (PC) board 608. An outer stopper 610 holds the heater sleeve 604, the PC board 608, and the inner Dewar 606 in place inside the outer Dewar 602.

Inside the inner Dewar 606 is a sensor housing 612 that may be held in place by an inner stopper 614. The sensor housing 612 includes a heater (not shown). A gimbal 616 and a gimbal shaft 618 supported by the gimbal 616 enable rotation of the gravity sensor 624 inside the sensor housing 612. The pivot axis 620 of the gimbal 616 is displaced at an angle to a longitudinal axis 622 of the tool 100. Preferably, the pivot axis 620 of the gimbal 616 is orthogonal to the longitudinal axis 622. A gravity sensor 624 that measures gravity is supported inside the gimbal 616.

The Dewars 602 and 606 define a temperature-stabilized chamber 626 for the gravity sensor 624. Typically, the temperature of the chamber is maintained at 14° C. above the highest ambient temperature rating in the borehole 102. The temperature may be controlled to 0.001° C. and modeled to $10^{-6}$° C. Small residual temperature changes in the chamber 626 may be compensated for by heaters in the sensor housing 612 and in the heater sleeve 604. The stoppers 610 and 614 at the ends of the Dewars 602 and 606, respectively, may also be heated and serve to prevent heat flow through the ends of the Dewars. The PC board 608 adjacent the inner Dewar 606 may control the heaters in the gravimeter 600.

The heater sleeve 604 may contain a magnetic shield that protects the gravity sensor 624 in the gimbal 616 from magnetic fields in the borehole 102. Magnetic fields in the borehole 102 can create torques on the gravity sensor which may result in errors in gravity measurements. It is understood that the present disclosure is not limited to the heater sleeve 604 containing the magnetic shield. The magnetic shield may be located with the sensor housing 612, the Dewars 602 and 606, and/or elsewhere. In some embodiments, the magnetic shield may be omitted entirely.

The gimbal shaft 618 of the gimbal 616 supports a pulley 628. A gimbal cable 630 is wound on the pulley 628 with the free ends of the gimbal cable 630 extending through the sensor housing 612 to the exterior of the gravimeter 600. During operation of the gravimeter 600, the free ends of the gimbal cable 630 may be linked to a gimbal drive assembly (not shown) that may extend or retract the free ends of the gimbal cable 630 to cause the gravity sensor 624 to be rotated about its pivot axis 620 through a predetermined angle and in a predetermined direction. The diameter of gimbal cable 630 may be relatively small to minimize heat loss and transfer between Dewars 602 and 606 and the environment. In some embodiments, the gravity measurement device 126 may be a gravimeter device such as are manufactured by Scintrex Limited of Ontario, Canada.

Referring again to FIG. 3, the anchoring mechanism 130 may be a lever and pad mechanism driven by a motorized lead screw, assembled as an independent wireline cartridge and connected to other cartridges or tools. When the anchor is deployed, the pad extends from the cartridge body and contacts one side of the borehole wall while the back side of the cartridge body contacts the opposite wall of the borehole. Two levers attach to the pad, such that the pad remains parallel to the longitudinal axis of the borehole 102 in order to maximize contact with the borehole 102. The pad has spikes on its surface that embed in the borehole wall to increase the holding capacity. Once the anchor is deployed, the wireline cable may be slackened to reduce transmission of vibration to the gravity measurement device 126.

The control module 120 may include a central processing unit (CPU) and/or other processor 302 coupled to a memory 300 in which are stored instructions for the acquisition and/or storage of the measurements, as well as instructions for other functions such as tractor control. Instructions for performing calculations based on the measurements may also be stored in the memory 300 for execution by the CPU 302. The CPU 302 may also be coupled to a communications interface 304 for wired and/or wireless communications via communication paths (not shown). It is understood that the CPU 302, memory 300, and communications interface 304 may be combined into a single device or may be distributed in many different ways. For example, the CPU 302, memory 300, and communications interface 304 may be separate components placed in a housing forming the control module 120, may be separate components that are distributed throughout the tool 100 and/or on the surface, or may be contained in an integrated package such as an application specific integrated circuit (ASIC). Means for powering the tool 100, receiving information from the surface and transferring information to the surface, and/or performing other functions unrelated to the primary measurements of the present disclosure may also be incorporated in the control module 120.

It is understood that selection of a particular feature and the positioning of the feature detection device 112 at or relative to the feature may be automated with the aid of the control module 120 and/or a controller located on the surface and connected to the feature detection device 112 via some telemetry means. In other embodiments, the selection and positioning may also be aided or accomplished with human interpretation of the data and judgment and with the aid of a telemetry means establishing communication of data and instructions between the feature detection device 112 and the interpreter.

Figure 7:
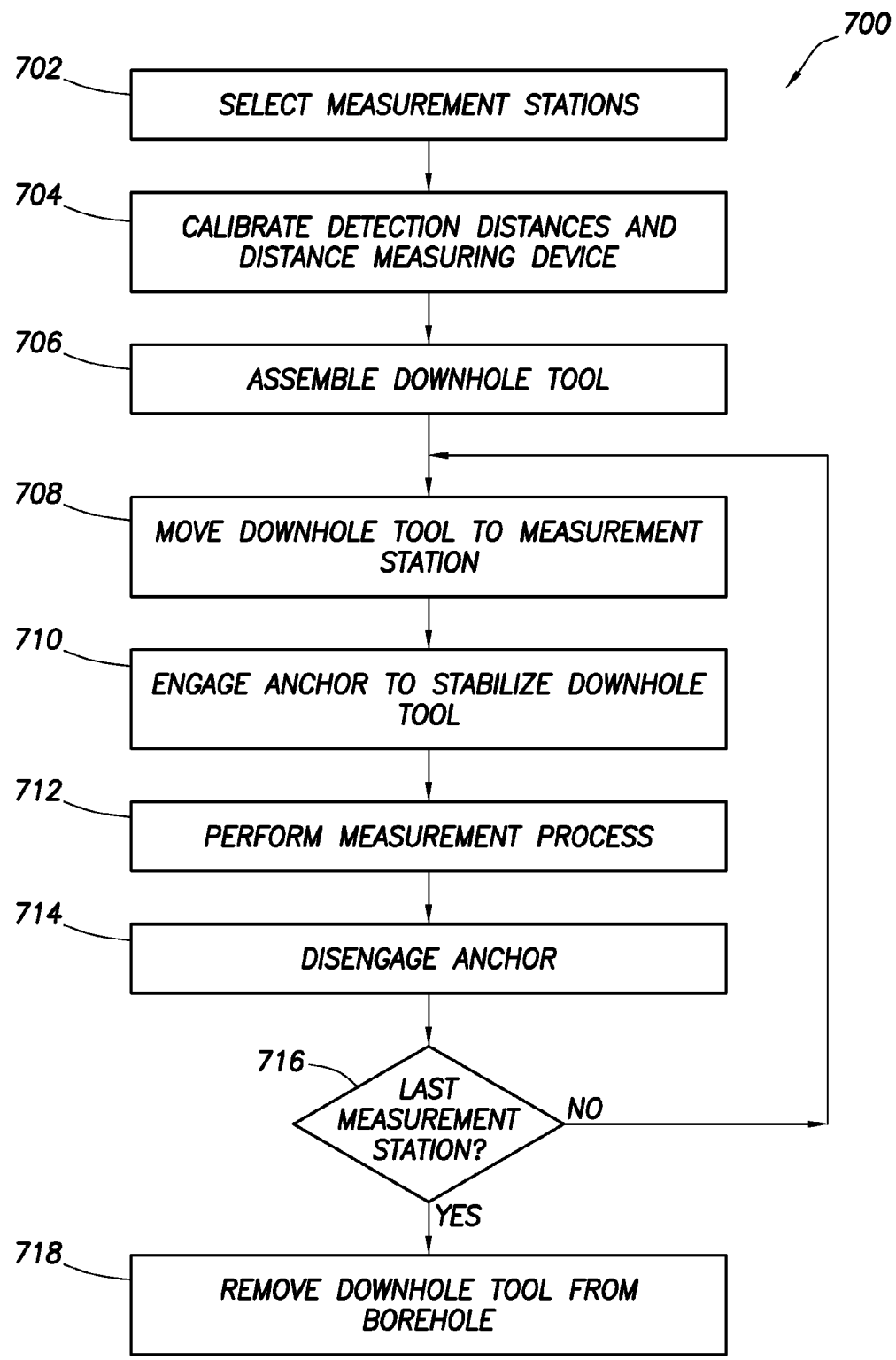
FIG. 7 is a flow chart diagram of at least a portion of a method according to one or more aspects of the present disclosure.

FIG. 7 is a flow-chart diagram of at least a portion of a method 700 according to one or more aspects of the present disclosure. The method 700 may be or comprise a process for deploying the tool 100 of FIG. 1 or FIG. 3 and performing primary (e.g., gravity) measurements with the tool 100. More specifically, the method 700 illustrates a process that uses the precision position indexing embodied in the tool 100 of FIGS. 1C and 3 and may be of particular value when a $\Delta z$ spacing is desired that is greater than the travel distance of the conveyance mechanism 116 within the housing 106.

In step 702, a plurality of measurement stations are selected. The measurement stations may be selected on the basis of existing well logs, a reservoir model, objectives of the gravity measurements, and/or any other desired factors. For example, the existing well logs may be analyzed to identify the features that will be used to position the gravity measurement device 122 in the initial and subsequent gravity measurement processes.

In step 704, a calibration process for the tool 100 is performed. For example, this calibration of the precision position indexing components may be accomplished by measuring, to a precision of 0.25 millimeters with a caliper, the distance between the center of sensitivity (i.e., measure point) of the gravity measuring device 122 and the measure point of the feature detection device 112 (e.g., the gamma-ray detector or SCCL). The entire assembly of gravity measuring device 122, feature detection device 112, conveyance mechanism 116, distance measurement device 114, and other intervening components may be removed from the housing 106 in order to perform the calibration. The fiducial marks 124 and 126 on the sub-assembly inner housings of the gravity measuring device 122 and the feature detection device 112 indicate the precise locations of the two instrument measure points and aid in the measurement of the distance between the two devices. The measure points of the gravity measuring device 122 or the feature detection device 112 may be additionally referenced to a fiducial mark 123 or other feature on the upper head 108 of the tool 100, by precisely measuring the distance between fiducial marks 123 and 126 or 123 and 124 while the moving assembly engages the limit switch 110 attached to the upper head 108. It is understood that any of the fiducial marks 123, 124 and 126 may be offset from its corresponding measure point by some distance known to 0.25 millimeters or better precision.

This calibration may be performed each time the assembly within the housing 106 is disassembled and reassembled and may also be performed in the case where one or more duplicate tools 100 are substituted during the series of time-lapse measurements. A correction for thermal expansion may be applied to account for the difference in temperature at the surface where the calibration is performed and the downhole temperature where the position indexing and gravity measurements are performed.

Calibration of the distance measurement device 114 (e.g., the optical encoder 412 of FIG. 4) may be accomplished by measuring the diameter of the encoder wheel 414, computing its circumference, rotating the wheel by one or more complete revolutions, and then adjusting a scale factor in corresponding acquisition software so that the distance indicated by the optical encoder 412 is equal to the appropriate integer number times the circumference. Zeroing of the optical encoder 412 may be performed once the entire assembly is reinstalled in the housing 106 and may be accomplished by driving the tractor 400 up or down until the moving assembly engages a stop or limit switch (e.g., the limit switch 110) at the upper or lower extreme of travel within the housing 106. This position of the tractor 400 may be defined as the zero of the optical encoder 412.

In addition to the calibration described above, azimuthal calibration of the tool 100 may be performed in the case where the feature detection device 112 or the primary measurement device 122 have azimuthally varying sensitivity and this variable sensitivity is useful. The azimuthal calibration includes performing an independent and precise measurement of the azimuthal angles between fiducial marks or other features on an azimuth measurement device (not shown) and the feature detection instrument 112, and optionally the primary measurement device 122 and the upper head 108 of the tool 100. Although described with respect to step 704, it is understood that this azimuthal calibration process need not be performed in conjunction with step 704.

The longitudinal distances and azimuthal angles measured during calibration are compared to reference data and offsets are determined. The two or three longitudinal offsets may be used to make a mechanical adjustment of the longitudinal positions of the feature detection device 112, the distance measurement device 114, and/or the gravity measurement device 122. The azimuthal offset may be used to make a mechanical adjustment of the azimuthal orientation of the azimuth measurement device, the feature detection device 112, and/or the gravity measurement device 122. Alternatively, the offsets may be used as input to a computation of position and orientation that corrects for the offsets.

Calibration of the amplitude of the feature detection device 112 output is optional for most downhole features used for indexing and for most feature detection devices because the shape of the one or two-dimensional log of the feature detection device output is used for indexing a position rather than its scale. An exception to this may be the case of an azimuthal array of feature detection devices where the gains of the detector elements within the array are matched via amplitude calibration.

In step 706, the tool 100 is assembled following the calibration process of step 704. This includes placing the calibrated assembly of gravity measuring device 122, feature detection device 112, conveyance mechanism 116, distance measurement device 114, and other intervening components back into the housing 106.

In step 708, the tool 100 is moved to the first measurement station identified in step 702. Step 708 may include, for example, lowering the tool 100 into the borehole 102 and positioning the tool 100 at the first measurement station using a standard odometer on the wireline cable and standard gamma-ray or CCL depth correlation using the gamma-ray detector linked to the tractor 400 of the conveyance device 116 or a CCL cartridge.

In step 710, once the tool 100 is in position, the anchoring mechanism 130 may be engaged to stabilize the tool 100 as described previously.

In step 712, a measurement process (described below in greater detail with respect to FIG. 8) is performed at the current measurement station.

Referring also to FIG. 8, a flow-chart diagram of at least a portion of a method 800 is illustrated according to one or more aspects of the present disclosure. In step 802, the distance measurement device 114 is zeroed by moving the distance measurement device 114 to a predefined limit. For example, in the case where the distance measurement device 114 is the optical encoder 412 and the conveyance mechanism 116 is the tractor 400, the zeroing of the optical encoder 412 may be accomplished by driving the tractor 400 up or down until the moving assembly engages a stop or limit switch (e.g., the limit switch 110) at the upper or lower extreme of travel within the housing 106. This position of the tractor 400 may be defined as the zero of the optical encoder 412. It is understood that the step of zeroing may occur elsewhere, although it may be desirable to zero the distance measurement device 114 after anchoring the tool 100.

Although not shown as a separate step in the present example, prior to step 804, a determination of the required vertical resolution of position may be made. The resolution may be derived from such factors as the requirements of the gravity measurements, which may vary with the sensitivity of the gravity measurement device 122, the vertical spacing of gravity measurement pairs, and the requirement on density precision for the particular application. This resolution requirement combined with the expected gamma-ray countrate or SCCL output amplitude for the given formation or completion characteristics may be used to determine the travel speed for the gamma-ray or SCCL device and whether and how much averaging may be applied to the data during analysis. For example, formations with a low gamma-ray countrate, completion hardware resulting in small or noisy SCCL output, and small vertical spacing of gravity measurement pairs may all require a relatively slow travel speed. This step may be performed at any time prior to step 804, and may even be performed prior to the tool 100 being placed into the borehole 102.

In step 804, multiple features and corresponding positions are recorded in a log using the feature detection device 112 and distance measurement device 114, respectively, while the feature detection device 112 and distance measurement device 114 are moved via the conveyance mechanism 116. In the present example, the feature detection device 112 and distance measurement device 114 are moved at an identical speed in the same direction, but it is understood that other relative movements may be used in some embodiments. For example, the feature detection device 112 and distance measurement device 114 may move at different speeds, may move in different directions, or one of the devices may move while the other device is stationary. Step 804 is directed to time-lapse reservoir monitoring and focuses on obtaining a repeatable or precise $\Delta z$ rather than on obtaining an accurate measurement of $\Delta z$.

More specifically, with respect to the embodiment of FIG. 3, the gamma-ray countrate or SCCL output amplitude is recorded as a function of position along the tractor travel path given by the optical encoder 114 and adjunctively as a function of time given by a clock internal to the tool 100 or by an external clock (e.g., a surface clock), thereby producing a log.

It is understood that various data processing techniques used in signal processing and data analysis may be applied to the data obtained from the feature detection device 112. The output of the feature detection device 112 may be collected in conjunction with the outputs of a clock, a longitudinal position measuring device, and/or an azimuth measuring device. This would produce a "log" of the feature detection device 112 output in one or two-dimensional space. For example, curve fitting using a least-squares fitting algorithm or averaging may be applied to the data to deal with the effects of random noise in the measurements and to thereby optimize the precision of the position index. In another example, a de-convolution of the spatial resolution form factor may be applied to the data from the feature detection device 112, in the case where the form factor is known through simulation studies and/or measurements, thereby improving the vertical resolution of the precision position indexing.

In step 806, a prominent feature is selected from the log and a position corresponding to the selected feature is identified from the log. Again referring to the embodiment of FIG. 3, in this step, an encoder position may be selected that corresponds or is relative to a local maximum, local minimum, or step-change in the data having a magnitude greater than the precision of the gamma-ray or SCCL measurement and which places the gravity measurement device 122 in relatively close proximity to the gravity measurement position determined in step 702 of method 700. The position of this feature becomes indexed position, $z_1$, which is used for the first and subsequent gravity measurements in the time-lapse series.

In step 808, the feature detection device 112 is moved based on the identified distance position to align the feature detection device 112 relative to the selected feature.

In step 810, a gravity measurement is taken using the gravity measuring device 122 while the feature detection device 112 is aligned with the selected feature. In other embodiments, a set of two or three gravity measurements may be taken using the small $\Delta z$ spacing available within the pressure housing 106 while the anchor mechanism 130 is engaged at the current measurement station. This gravity measurement may conclude the measurement sequence for the first measurement station.

Returning to FIG. 7, after the measurement process of FIG. 8 is performed, the anchoring mechanism 130 is disengaged in step 714.

In step 716, a determination may be made as to whether the current measurement station (e.g., the measurement station to which the tool 100 was moved in step 708) is the last measurement station. If the current measurement station is the last measurement station, the tool 100 is removed from the borehole 102. If the current measurement station is not the last measurement station, the method 700 returns to step 708 and the tool 100 is moved to the next measurement station.

Accordingly, the analysis and selection process of FIG. 7 may be repeated for each position in the borehole 102 at which gravity measurements are to be taken during the first of a series of time-lapse measurements. For each subsequent time-lapse measurement in the series, a new precision log of gamma-ray countrate or SCCL output is obtained, the data is re-analyzed, the same feature selected during the first measurement in the time-lapse series is identified, and the gravity measurement device 122 is positioned in the same position relative to the feature as was used for the first measurement.

For example, assume that the tool 100 is moved to another measurement station, another log is recorded, another prominent feature is identified with a corresponding position, and another gravity measurement is taken at that position as described above and illustrated in FIG. 7. The position of this second feature is the precisely indexed position, $z_2$ Like $z_1$, $z_2$ may be used for the first and subsequent gravity measurements in the time-lapse series. The positions of $z_1$ and $z_2$ are the positions of the first pair of gravity measurements, $g_{01}$ and $g_{02}$, that compose the first differential gravity measurement, $\Delta g_{01}$, and a coarse estimate of the first vertical interval is given by $\Delta z_1 = z_2 - z_1$. After completing the measurement at $z_2$, the measurement at $z_1$ may be repeated or the measurement at $z_2$ may be sub-divided into two measurements for the purpose of computing a drift correction. This sequence may be repeated for all $\Delta z_i$. Individual $z_i$ may, if desired, be used for two $\Delta z_i$ where $z_i$ is the middle point of three points. In some embodiments, $z_i$ may be repeated for drift correction computations and for repeatability validation.

In another embodiment, the tool 100 may be used as described in previously incorporated U.S. Pat. No. 5,970,787. Such an embodiment may not use the precision position indexing of the present disclosure, may not use the gamma-ray detector or SCCL linked to the conveyance mechanism 116, and may restrict $\Delta z_i$ to the maximum distance of travel of the conveyance mechanism 116 within the housing 106. In this embodiment, calibration may be performed by measuring the distance between the gravity measurement device 122 and a fiducial mark 123 on the upper head 108 of the tool 100 while the upper limit switch 110 is engaged, measuring the circumference of the optical encoder wheel 414 of the distance measurement device 114, and optionally measuring the distance between the gravity measurement device 122 and the feature detection device 112 (e.g., the gamma-ray detector or SCCL).

A logging tool string may be assembled at the well-site comprising a logging head, telemetry cartridge, anchor, gamma-ray or CCL cartridge, power supply cartridge, auxiliary battery cartridge, and gravity tool comprising an optional gamma-ray detector or SCCL, tractor, gravity sensor and other elements as described above. The tool string is then lowered into the borehole 102 and positioned at the first measurement station using an odometer on the wireline cable and standard gamma-ray or CCL depth correlation and using one or more of the gamma-ray detector, CCL, or SCCL. Once the tool string is positioned at the first measurement station, the anchor 130 is engaged and the wireline may be slackened. The tractor 400 is driven to the upper or lower limit switch and the optical encoder 412 is zeroed. A first gravity measurement is taken. The tractor 400 is then driven to the opposite limit switch or to an intermediate position and a second gravity measurement taken. The tractor 400 is then returned to its first position and a repeat gravity measurement is taken. This concludes the sequence for the first measurement station. The anchor 130 is then disengaged and the logging string moved to the next measurement station where the process is repeated.

It is understood that the methods described herein may be applied to any primary measurement where precise positioning is a requirement. Accordingly, gravity measurement is only an example of such measurement. Time-lapse measurements in hydrocarbon reservoir boreholes may have a demanding requirement on repeatability in the time domain that spans the initial and all of the subsequent measurements. There may also be a demanding repeatability requirement in the space domain since borehole measurements are typically taken at multiple depths within the borehole. Examples of primary measurements or applications that may benefit from this method include (1) time-lapse monitoring of fluid and gas movements in hydrocarbon reservoirs with borehole gravity, (2) time-lapse monitoring of reservoir subsidence (i.e., compaction) or uplift (i.e., rebound) using the feature detection device as the primary measurement instrument, (3) time-lapse monitoring of the movement of geologic formations due to tectonic or volcanic forces using the feature detection device as the primary measurement instrument, (4) one-time or time-lapse measurement of petrophysical properties in thin beds using the feature detection device as the primary measurement instrument or using separate feature detection and primary measurement devices, (5) pipe, tube, or casing inspection using the feature detection device as the primary measurement instrument or using separate feature detection and primary measurement devices, (6) precise placement of perforations in a well casing or tubing, (7) any of examples (1)-(6) using various conveyances of the downhole tool 100 such as wireline, slickline with memory module, coiled tubing, or tractor, and (8) any of examples (1)-(5) where the first in a series of time-lapse measurements or a one-time measurement is accomplished while being conveyed in a drilling bottom-hole-assembly as in the practice in logging-while-drilling.

In view of all of the above and the figures, it should be readily apparent to those skilled in the art that the present disclosure introduces a method for use in a downhole tool having a distance measurement device, a feature detection device, and a primary measurement device positioned therein, the method comprising: recording in a first log, while the downhole tool is in a borehole, a first plurality of features detected using the feature detection device while the feature detection device and the distance measurement device are being moved within the downhole tool, wherein each of the first plurality of features is recorded with a corresponding position measured using the distance measurement device; selecting a first feature of the first plurality of features in the first log and identifying the position corresponding to the first feature; moving the feature detection device based on the identified position of the first feature to align the feature detection device relative to the first feature; taking a first primary measurement using the primary measurement device while the feature detection device is aligned relative to the first feature; and repeating the steps of recording, selecting, moving, and taking to obtain at least a second primary measurement while the feature detection device is aligned relative to a second feature of a second plurality of features in a second log. The method may further comprise zeroing the distance measurement device prior to recording the first plurality of features. The method may further comprise: moving the downhole tool to a first measurement station in the borehole prior to recording the first plurality of features; and moving the downhole tool to a second measurement station in the borehole prior to recording the second plurality of features. The method may further comprise: determining a desired resolution of the recorded positions, wherein the desired resolution identifies an amount of distance that is to be present between each recorded pair of positions; and selecting a speed at which the feature detection device and the distance measurement device are being moved in order to achieve the determined resolution. Recording the first plurality of features in the first log may include recording a data set obtained during a recording period. Selecting the first feature of the first plurality of features may include identifying at least one of a local maximum, a local minimum, and a step-change in the data set. The at least one of the local maximum, local minimum, and step-change may have a magnitude greater than a precision of the feature detection device. The method may further comprise, after removing the downhole tool from the borehole and then placing the same downhole tool or another downhole tool into the borehole after a period of time has elapsed, repeating the steps of recording, selecting, moving, and taking to obtain third and fourth primary measurements made while the feature detection device is in the same alignment relative to the first and second features, respectively, as when the steps of recording, selecting, moving, and taking were performed to obtain the first and second primary measurements. The period of time may be greater than twenty-four hours. The method may further comprise: selecting at least first and second measurement stations; calibrating the feature detection device and the distance measuring device prior to assembling the downhole tool; moving the downhole tool into the borehole to the first measurement station after assembling the downhole tool; engaging an anchor mechanism to stabilize the downhole tool in the borehole; disengaging the anchor mechanism after performing the steps of recording, selecting, moving, and taking the first primary measurement; and moving the downhole tool to the second measurement station to repeat the steps of recording, selecting, moving, and taking to obtain the second primary measurement, wherein a distance between the first and second measurement stations is greater than a maximum travel distance of a conveyance mechanism positioned within the downhole tool. The primary measurement device may be a gravity measurement device. The first and second logs may be the same log.

The present disclosure also introduces a method for indexing fixed positions in a borehole using a downhole tool comprising: selecting at least first and second measurement stations, wherein a distance between the first and second measurement stations is greater than a maximum travel distance of a conveyance mechanism positioned within the downhole tool; moving the downhole tool in the borehole to the first measurement station; recording a first data set representing a first plurality of features and a position of each of the first plurality of features at the first measurement station; selecting a first feature from the first data set and taking a first measurement based on the position of the first feature; moving the downhole tool in the borehole to the second measurement station; recording a second data set representing a second plurality of features and a position of each of the second plurality of features at the second measurement station; and selecting a second feature from the second data set and taking a second measurement based on the position of the second feature. The method may further comprise: engaging an anchor mechanism to stabilize the downhole tool in the borehole at each of the first and second measurement stations prior to recording each of the first and second data sets; and disengaging the anchor mechanism after taking each of the first and second measurements. The method may further comprise calibrating a feature detection device used to record the first and second plurality of features relative to a distance measuring device used to record the position of each of the first and second plurality of features and relative to a primary measurement device used to take the first and second measurements. The method may further comprise calibrating the feature detection device relative to a tool upper head. The method may further comprise calculating a subsidence value for a formation forming at least a portion of the borehole, wherein the calculating is based at least in part on the first and second measurements.

The present disclosure also introduces a downhole tool comprising: a feature detection device configured to detect a plurality of features external to the downhole tool when positioned in a borehole; a primary measurement device configured to measure a value of a defined type; a conveyance mechanism coupled to the feature detection device and the primary measurement device, wherein the conveyance mechanism is configured to controllably move the feature detection device and the primary measurement device within the downhole tool; a distance measuring device configured to measure a distance traveled by the conveyance mechanism; and computer-executable instructions for controlling the conveyance mechanism to position the primary measurement device relative to a feature of the plurality of features detected by the feature detection device based on a position of the feature as measured by the distance measurement device. The feature detection device may be at least one of a gamma-ray detector and a stationary casing collar locator (SCCL). The primary measurement device may be a gravimeter. The conveyance mechanism may be a wheeled tractor. The distance measurement device may be an optical encoder. The downhole tool may be configured for conveyance in a wellbore via at least one of a wireline and a drill pipe.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method for use in a downhole tool having a distance measurement device, a feature detection device, and a primary measurement device positioned therein, the method comprising:
    recording in a first log, while the downhole tool is in a borehole, a first plurality of features detected using the feature detection device while the feature detection device and the distance measurement device are being moved with respect to the downhole tool, wherein each of the first plurality of features is recorded with a corresponding position measured using the distance measurement device, wherein the corresponding position of each of the first plurality of features corresponds to a distance measurement relating to an internal position of the feature detection device with respect to the downhole tool when the feature detection device detected the respective plurality of features;
    selecting a first feature of the first plurality of features in the first log and identifying the position corresponding to the first feature;
    without controllably moving an overall position of the downhole tool in the borehole, moving the feature detection device with respect to the downhole tool based on the identified relative position of the first feature to align the feature detection device relative to the first feature;
    taking a first primary measurement using the primary measurement device while the feature detection device is aligned relative to the first feature; and
    repeating the steps of recording, selecting, moving, and taking to obtain at least a second primary measurement while the feature detection device is aligned relative to a second feature of a second plurality of features in a second log.

2. The method of claim 1, comprising:
    zeroing the distance measurement device a first time prior to recording the first plurality of features; and
    zeroing the distance measurement device a second time prior to recording the second plurality of features.

3. The method of claim 1 comprising:
    moving the downhole tool to a first measurement station in the borehole prior to recording the first plurality of features; and
    moving the downhole tool to a second measurement station in the borehole prior to recording the second plurality of features.

4. The method of claim 1 comprising:
    determining a desired resolution of the recorded positions, wherein the desired resolution identifies an amount of distance that is to be present between each recorded pair of positions; and
    selecting a speed at which the feature detection device and the distance measurement device are being moved in order to achieve the determined resolution.

5. The method of claim 1 wherein recording the first plurality of features in the first log includes recording a data set obtained during a recording period, and wherein selecting the first feature of the first plurality of features includes identifying at least one of a local maximum, a local minimum, and a step-change in the data set.

6. The method of claim 5 wherein the at least one of the local maximum, local minimum, and step-change have a magnitude greater than a precision of the feature detection device.

7. The method of claim 1 comprising, after removing the downhole tool from the borehole and then placing the same downhole tool or another downhole tool into the borehole after a period of time has elapsed, repeating the steps of recording, selecting, moving, and taking to obtain third and fourth primary measurements made while the feature detection device is in the same alignment relative to the first and second features, respectively, as when the steps of recording, selecting, moving, and taking were performed to obtain the first and second primary measurements.

8. The method of claim 7 wherein the period of time is greater than twenty-four hours.

9. The method of claim 1 comprising:
    selecting at least first and second measurement stations;
    calibrating the feature detection device and the distance measuring device prior to assembling the downhole tool;
    moving the downhole tool into the borehole to the first measurement station after assembling the downhole tool;
    engaging an anchor mechanism to stabilize the downhole tool in the borehole;
    disengaging the anchor mechanism after performing the steps of recording, selecting, moving, and taking the first primary measurement; and
    moving the downhole tool to the second measurement station to repeat the steps of recording, selecting, moving, and taking to obtain the second primary measurement, wherein a distance between the first and second measurement stations is greater than a maximum travel distance of a conveyance mechanism positioned within the downhole tool.

10. The method of claim 1 wherein the primary measurement device is a gravity measurement device.

11. The method of claim 1 wherein the first and second logs are the same log.

12. A method for indexing fixed positions in a borehole using a downhole tool comprising:
    selecting at least first and second measurement stations, wherein a distance between the first and second measurement stations is greater than a maximum travel distance of a conveyance mechanism positioned within the downhole tool that moves internally within the downhole tool and with respect to the downhole tool;
    moving the downhole tool in the borehole to the first measurement station;

recording a first data set representing a first plurality of features and a relative position of each of the first plurality of features at the first measurement station with respect to the downhole tool;

selecting a first feature from the first data set and, without controllably moving the overall position of the downhole tool in the borehole, moving the conveyance mechanism with respect to the downhole tool to relate the conveyance mechanism to the first feature and taking a first measurement based on the relative position of the first feature;

moving the downhole tool in the borehole to the second measurement station;

recording a second data set representing a second plurality of features and a relative position of each of the second plurality of features at the second measurement station with respect to the downhole tool; and selecting a second feature from the second data set and, without controllably moving the overall position of the downhole tool in the borehole, moving the conveyance mechanism with respect to the downhole tool to relate the conveyance mechanism to the second feature and taking a second measurement based on the position of the second feature.

13. The method of claim 12 comprising:
engaging an anchor mechanism to stabilize the downhole tool in the borehole at each of the first and second measurement stations prior to recording each of the first and second data sets; and
disengaging the anchor mechanism after taking each of the first and second measurements.

14. The method of claim 12 comprising calibrating a feature detection device used to record the first and second plurality of features relative to a distance measuring device used to record the position of each of the first and second plurality of features and relative to a primary measurement device used to take the first and second measurements.

15. The method of claim 14 comprising calibrating the feature detection device relative to a tool upper head.

16. The method of claim 12 comprising calculating a subsidence value for a formation forming at least a portion of the borehole, wherein the calculating is based at least in part on the first and second measurements.

17. A downhole tool comprising:
a feature detection device configured to detect a plurality of features external to the downhole tool when positioned in a borehole;
a primary measurement device configured to measure a value of a defined type;
a conveyance mechanism coupled to the feature detection device and the primary measurement device, wherein the conveyance mechanism is configured to controllably move the feature detection device and the primary measurement device with respect to the downhole tool;
a distance measuring device configured to measure a distance traveled by the conveyance mechanism with respect to the downhole tool; and
computer-executable instructions for controlling the conveyance mechanism to position the primary measurement device relative to a feature of the plurality of features detected by the feature detection device based on a position of the feature as measured by the distance measurement device.

18. The downhole tool of claim 17 wherein the feature detection device is at least one of a gamma-ray detector and a stationary casing collar locator (SCCL).

19. The downhole tool of claim 17 wherein the primary measurement device is a gravimeter.

20. The downhole tool of claim 17 wherein the conveyance mechanism is a wheeled tractor.

21. The downhole tool of claim 17 wherein the distance measurement device is an optical encoder.

22. The downhole tool of claim 17 wherein the downhole tool is configured for conveyance in a wellbore via at least one of a wireline and a drill pipe.

* * * * *